(12) United States Patent
Livesay et al.

(10) Patent No.: US 10,467,468 B2
(45) Date of Patent: *Nov. 5, 2019

(54) SYSTEM AND METHOD FOR IDENTITY PROOFING AND KNOWLEDGE BASED AUTHENTICATION

(71) Applicant: Michigan Health Information Network Shared Services, East Lansing, MI (US)

(72) Inventors: Jeff Livesay, Pinckney, MI (US); Tim Pletcher, East Lansing, MI (US); Brian Seggie, Howell, MI (US); Tony Ward, Fairfax, VA (US)

(73) Assignee: Michigan Health Information Network Shared Services, East Lansing, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,464

(22) Filed: Jun. 21, 2017

(65) Prior Publication Data

US 2017/0286768 A1 Oct. 5, 2017

Related U.S. Application Data

(63) Continuation-in-part of application No. 15/345,142, filed on Nov. 7, 2016, now Pat. No. 10,009,332,
(Continued)

(51) Int. Cl.
*G06F 7/04* (2006.01)
*G06K 9/00* (2006.01)
(Continued)

(52) U.S. Cl.
CPC ..... *G06K 9/00483* (2013.01); *G06K 9/00288* (2013.01); *G06K 9/00892* (2013.01);
(Continued)

(58) Field of Classification Search
CPC ..... H04L 63/10; H04L 63/101; H04L 63/105; H04L 63/08; H04L 9/3271; H04L 9/32;
(Continued)

(56) References Cited

U.S. PATENT DOCUMENTS 6,978,268 B2 12/2005 Thomas et al.
7,941,324 B1 5/2011 Sholtis
(Continued)

FOREIGN PATENT DOCUMENTS

EP 2 747 369 6/2014

OTHER PUBLICATIONS

Non-Final Office Action on U.S. Appl. No. 14/643,910 dated May 3, 2018.
(Continued)

*Primary Examiner* — Samson B Lemma
(74) *Attorney, Agent, or Firm* — Honigman LLP

(57) ABSTRACT

Illustrative methods, processes, and software remotely prove the identity of individuals fully compliant with identity proofing policies. The embodiments receive a request to verify an identity from an applicant device. The request includes an identification for an application to which access is desired. Then, the embodiments receive any combination of credit-based, clinical-based, and/or claims-based information corresponding to an applicant identified in the received request; send to the applicant device one or more queries related to the received combination according to one or more identity proofing requirements; receive, from the applicant device, one or more responses to the one or more queries where the one or more response comprise authentication information; determine a match between the authentication information and the received combination of any of credit-based, clinical-based, and claims-based information;

(Continued)

and, based on the determination of the match, granting access to the desired application to the applicant device.

19 Claims, 34 Drawing Sheets

Related U.S. Application Data which is a continuation of application No. 14/949,395, filed on Nov. 23, 2015, now Pat. No. 9,491,160, which is a continuation-in-part of application No. 14/642,092, filed on Mar. 9, 2015, now Pat. No. 9,197,638, and a continuation-in-part of application No. 14/643,910, filed on Mar. 10, 2015.

(51) Int. Cl.
  *H04L 29/06* (2006.01)
  *H04L 29/08* (2006.01)
  *H04W 12/02* (2009.01)

(52) U.S. Cl.
  CPC .......... *H04L 63/08* (2013.01); *H04L 63/0815* (2013.01); *H04L 63/0853* (2013.01); *H04L 63/0861* (2013.01); *H04L 67/02* (2013.01); *H04W 12/02* (2013.01); *H04L 63/0807* (2013.01)

(58) Field of Classification Search
  CPC .............. H04L 9/3216; G06K 9/00288; G06K 9/00486; G06F 21/30
  USPC .......................................................... 726/7
  See application file for complete search history.

(56) References Cited

U.S. PATENT DOCUMENTS

| | | | |
|---|---|---|---|
| 8,275,850 B2 | 9/2012 | Kohan et al. | |
| 8,285,565 B2 | 10/2012 | Kerr et al. | |
| 8,294,236 B2 | 10/2012 | Mitsuhira et al. | |
| 8,631,486 B1* | 1/2014 | Friedman ................ G06F 21/31 726/19 |
| 8,639,529 B2 | 1/2014 | Lee | |
| 8,894,282 B2 | 11/2014 | Town et al. | |
| 8,924,236 B2 | 12/2014 | Marchosky | |
| 8,984,282 B1 | 3/2015 | Kragh | |
| 9,197,368 B2 | 11/2015 | Ghiasi et al. | |
| 9,210,156 B1* | 12/2015 | Little ..................... H04L 63/08 |
| 9,230,077 B2* | 1/2016 | Markwordt ............. H04L 63/08 |
| 9,491,160 B2 | 11/2016 | Livesay et al. | |
| 2004/0128165 A1 | 7/2004 | Block et al. | |
| 2005/0044413 A1 | 2/2005 | Elms et al. | |
| 2005/0187794 A1 | 8/2005 | Kimak | |
| 2008/0046984 A1 | 2/2008 | Bohmer et al. | |
| 2011/0010762 A1 | 1/2011 | Nijdam et al. | |
| 2011/0125646 A1 | 5/2011 | Yung | |
| 2012/0136678 A1 | 5/2012 | Steinberg | |
| 2012/0173285 A1 | 7/2012 | Muthukrishnan | |
| 2012/0191621 A1 | 7/2012 | Williams et al. | |
| 2012/0203576 A1 | 8/2012 | Bucur et al. | |
| 2012/0323601 A1 | 12/2012 | Huang et al. | |
| 2013/0030836 A1 | 1/2013 | Ackerson et al. | |
| 2014/0020073 A1 | 1/2014 | Ronda et al. | |
| 2014/0149140 A1 | 5/2014 | Ellis | |
| 2014/0189835 A1* | 7/2014 | Umerley ................ G06F 21/40 726/7 |
| 2014/0278542 A1 | 9/2014 | Fernandez | |
| 2014/0331278 A1 | 11/2014 | Tkachev | |
| 2014/0331282 A1 | 11/2014 | Tkachev | |
| 2015/0095999 A1* | 4/2015 | Toth ........................ H04L 63/08 726/6 |
| 2015/0332000 A1 | 11/2015 | Bess et al. | |
| 2016/0034642 A1 | 2/2016 | Ehrhart et al. | |
| 2016/0036807 A1* | 2/2016 | Knauss ............... H04L 63/0838 726/7 |
| 2016/0267115 A1 | 9/2016 | Pletcher et al. | |
| 2017/0006008 A1* | 1/2017 | Moran ................... H04L 63/08 |
| 2017/0118190 A1 | 4/2017 | Livesay et al. | |
| 2017/0286768 A1 | 10/2017 | Livesay et al. | |

OTHER PUBLICATIONS

Notice of Allowance on U.S. Appl. No. 15/345,142 dated Mar. 27, 2018.
Final Office Action on U.S. Appl. No. 14/643,910 dated Jan. 18, 2018.
Experian, "Identity Proofing and NIST SP 800-63: Applications in Healthcare" May 10, 2011.
Grimson et al., "Sharing Health-Care Records over the Internet," IEEE Internet Computing, May/Jun. 2001, pp. 49-58.
International Search Report and Written Opinion on PCT/US16/20383, dated Oct. 11, 2016.
International Search Report and Written Opinion on PCT/US2016/020617, dated May 19, 2016.
Klein, Netsmart, "Electronic Prescribing of Controlled Substances: Prescribe Identity Proofing and Credentialing," Part 2 of a 3 Part Series, Feb. 19, 2015.
NIST Special Publication 800-63-2, Electronic Authentication Guideline dated Aug. 2013, 123 pages.
Non-Final Office Action on U.S. Appl. No. 14/949,395 dated Apr. 22, 2016.
Non-Final Office Action on U.S. Appl. No. 14/642,092, dated Jun. 8, 2015.
Non-Final Office Action on U.S. Appl. No. 14/643,910 dated Aug. 3, 2017.
Non-Final Office Action on U.S. Appl. No. 15/345,142 dated Jul. 6, 2017.
Notice of Allowance on U.S. Appl. No. 14/642,092, dated Sep. 29, 2015.
Notice of Allowance on U.S. Appl. No. 14/949,395 dated Aug. 12, 2016.
Ralston et al., "Patient Web Services Integrated with a Shared Medical Record: Patient Use and Satisfaction," 2007, pp. 798-806.
International Preliminary Report on Patentability issued on PCT/US2016/020383, dated Sep. 21, 2017.
International Preliminary Report on Patentability issued on PCT/US2016/020617, dated Sep. 21, 2017.

* cited by examiner

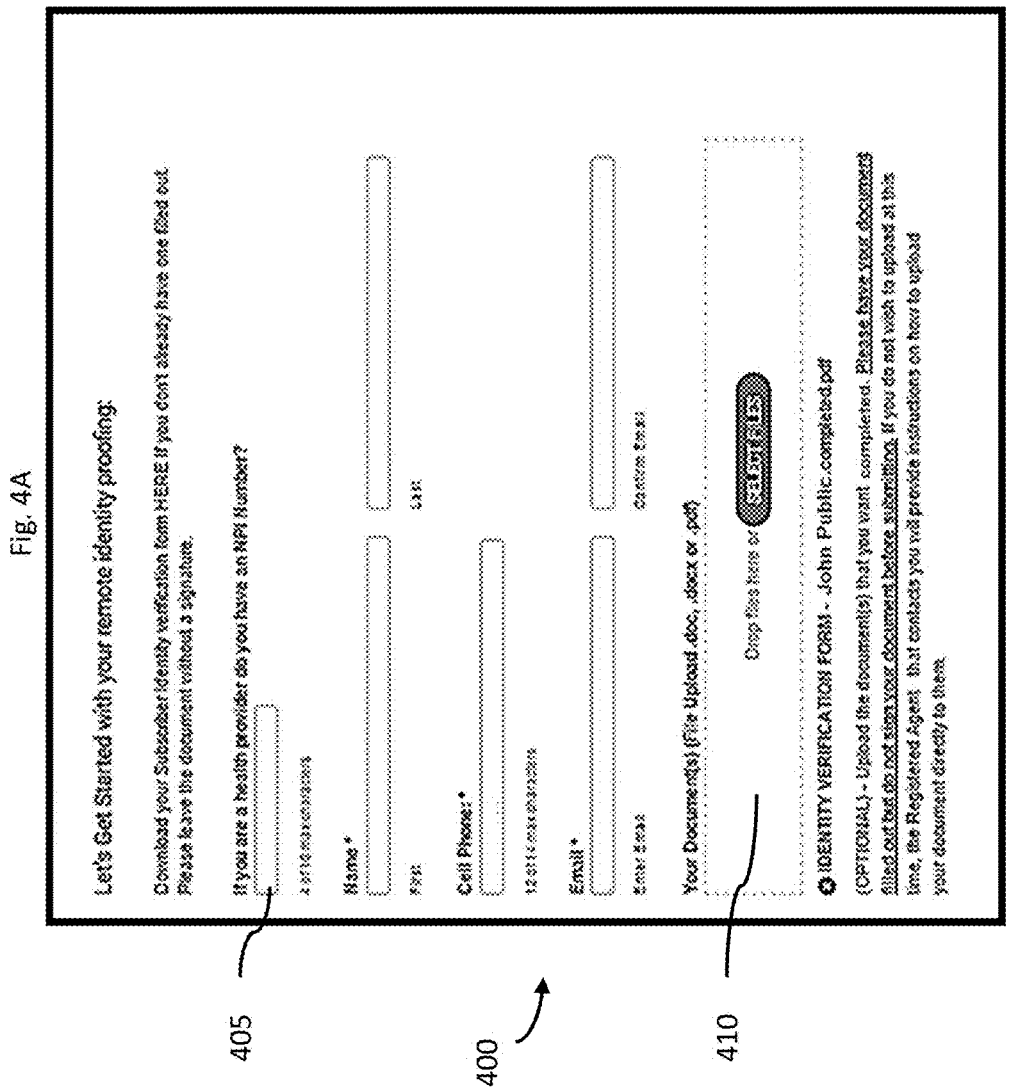

Fig. 4B

If you have Discount Code please enter it here:

Do you have access to a PC or Laptop with a webcam?
● Yes
○ No

Do you have or have you previously had a physical address in the United States?
● Yes
○ No If you do not see an email from us PLEASE CHECK YOUR SPAM/JUNK Folder and allow us.

SUBMIT & CONTINUE 425
420
430

Fig. 5

Please verify your Identity

First Name
Last Name
Birthday
Street Address
City
State
ZIP
Last Four of SSN Click Here if you have never lived in the United States Send
Cancel

500

Fig. 6

Please answer a few questions

Where was your social security number issued?
○ Wisconsin
○ South Dakota
○ North Carolina
○ None of the above In which city is S 6TH ST?
○ LAKE ALMANOR
○ SMITHFIELD
○ FREDONIA
○ None of the above Which number goes with your address on LASSITER MILL RD?
○ 2055
○ 4209
○ 14051
○ None of the above In which county have you lived?
○ CARLTON
○ MECKLENBURG
○ ROCKWALL Send Cancel

600

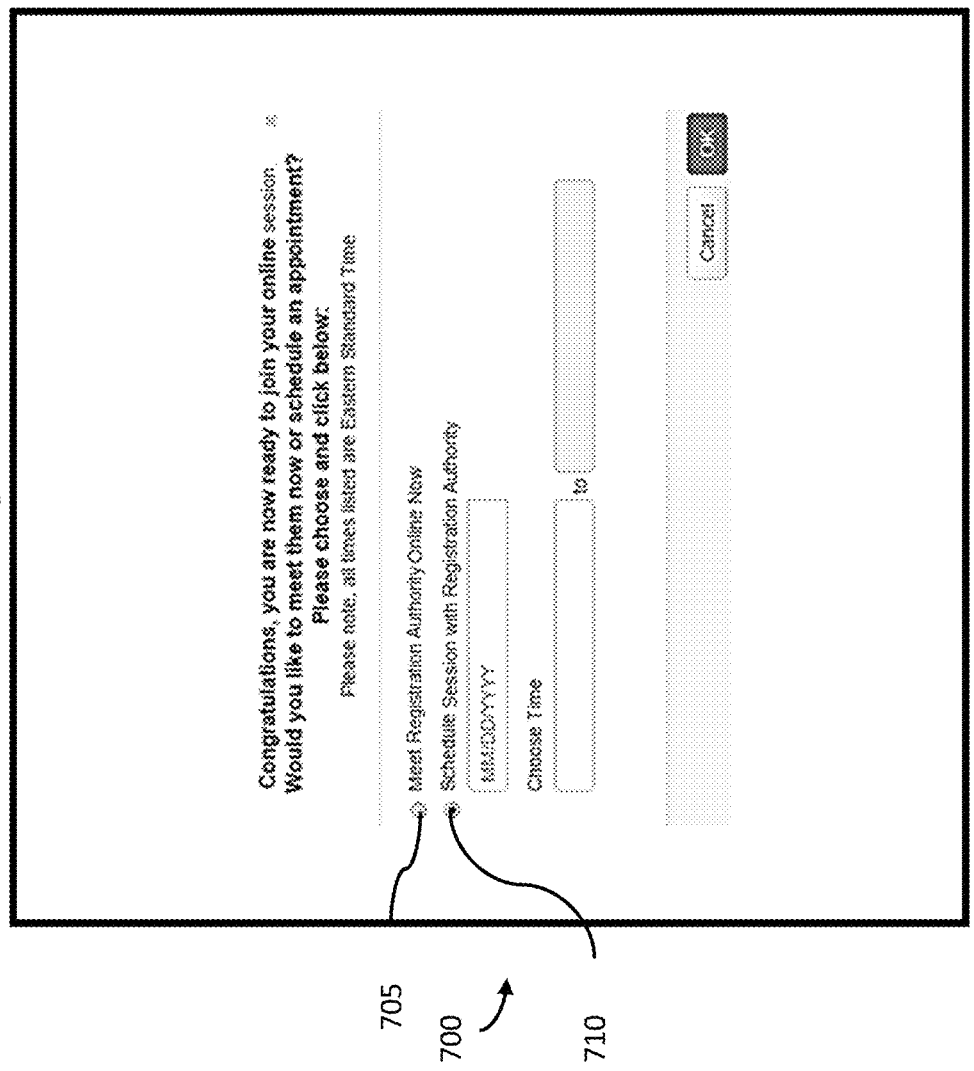

Welcome to the Remote Identity Proofing Service

Here you can prove your identity and receive Trusted Identity credentials to allow secure single sign-on

GET STARTED
1305

SEE QUICK DEMO
1310

PRICES
1315

1300

Terms and Conditions

Please read through the Terms and Conditions below and confirm your agreement by checking "I agree"

I AGREE ☐

Timestamp of agreement recorded and added to the final completed form

Applicant Information

1600

The applicant for a Trusted Identity should enter the information below:

| First name |
|---|
| Middle initial |
| Last name |
| Street address |
| City |
| State |
| ZIP |
| Email address |
| Date of Birth (mm-dd-yyyy) |
| Cell phone number |
| Last 4 of SSN |
| *NPI (National Provider Identifier) |

If you have a pre-paid discount code enter it here: 1605 next step  1610

*Indicates optional field

Fig. 17

Confirm Personal Information

_1700_

This form has been pre-populated from previous questions

| First name | ~~~~~~~~~~~~~~~ |
| Middle initial | ~ |
| Last name | ~~~~~~~~~~~~~~~ |
| Street address | #### ~~~~~~~~~~~~ |
| City | ~~~~~~~~~~~ |
| State | ~~~~~ |
| ZIP | ##### |
| Email address | ~~~~~~~~~~~@~~~~~~~. ~~~ |
| Date of Birth (mm-dd-yyyy) | ##/##/#### |
| Cell phone number | ###-###-#### |
| Last 4 of SSN | #### |
| NPI (National Provider Identifier) | ########## |

[ Go Back ] — 1705

[ Confirm ] — 1710

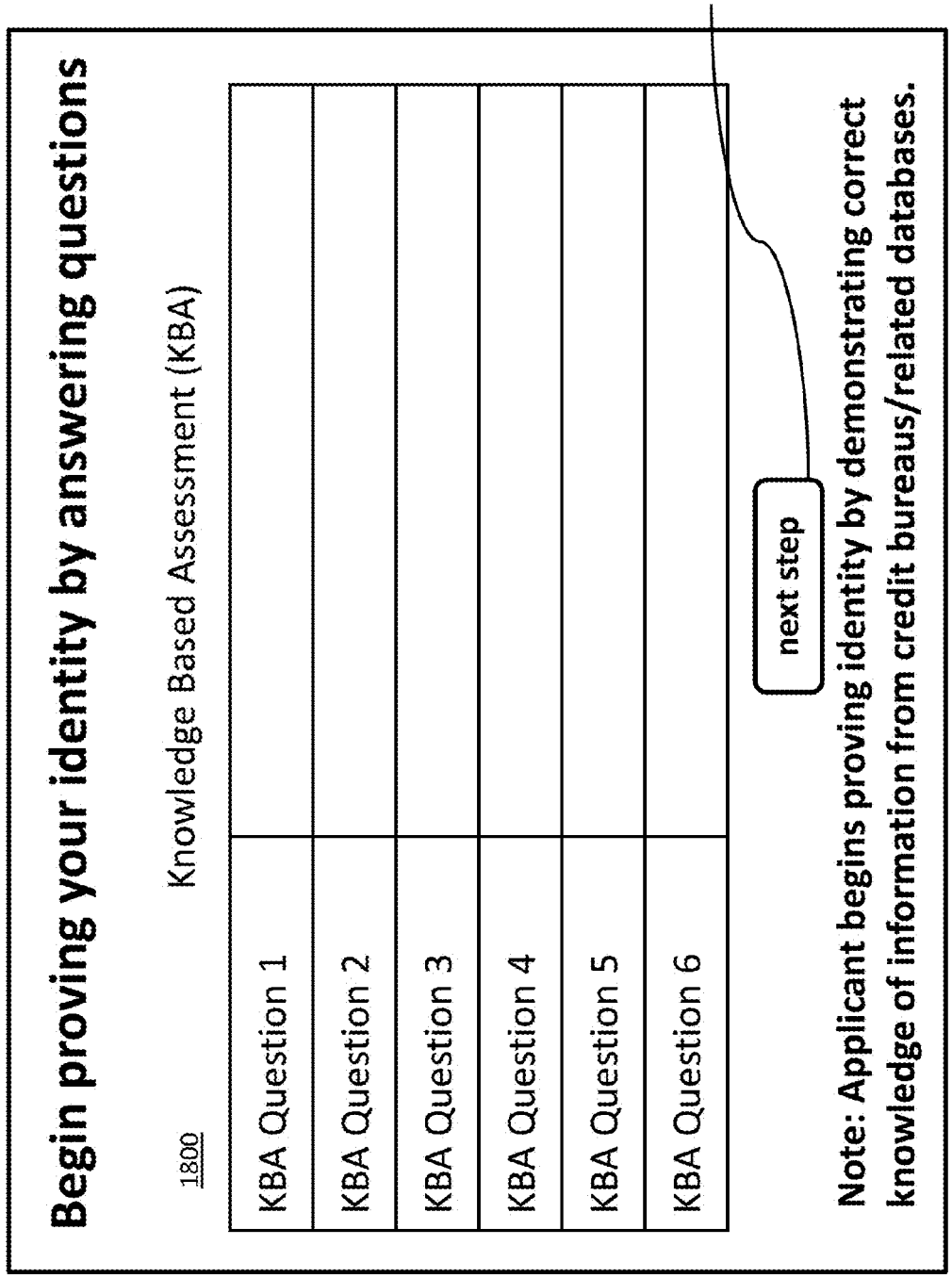

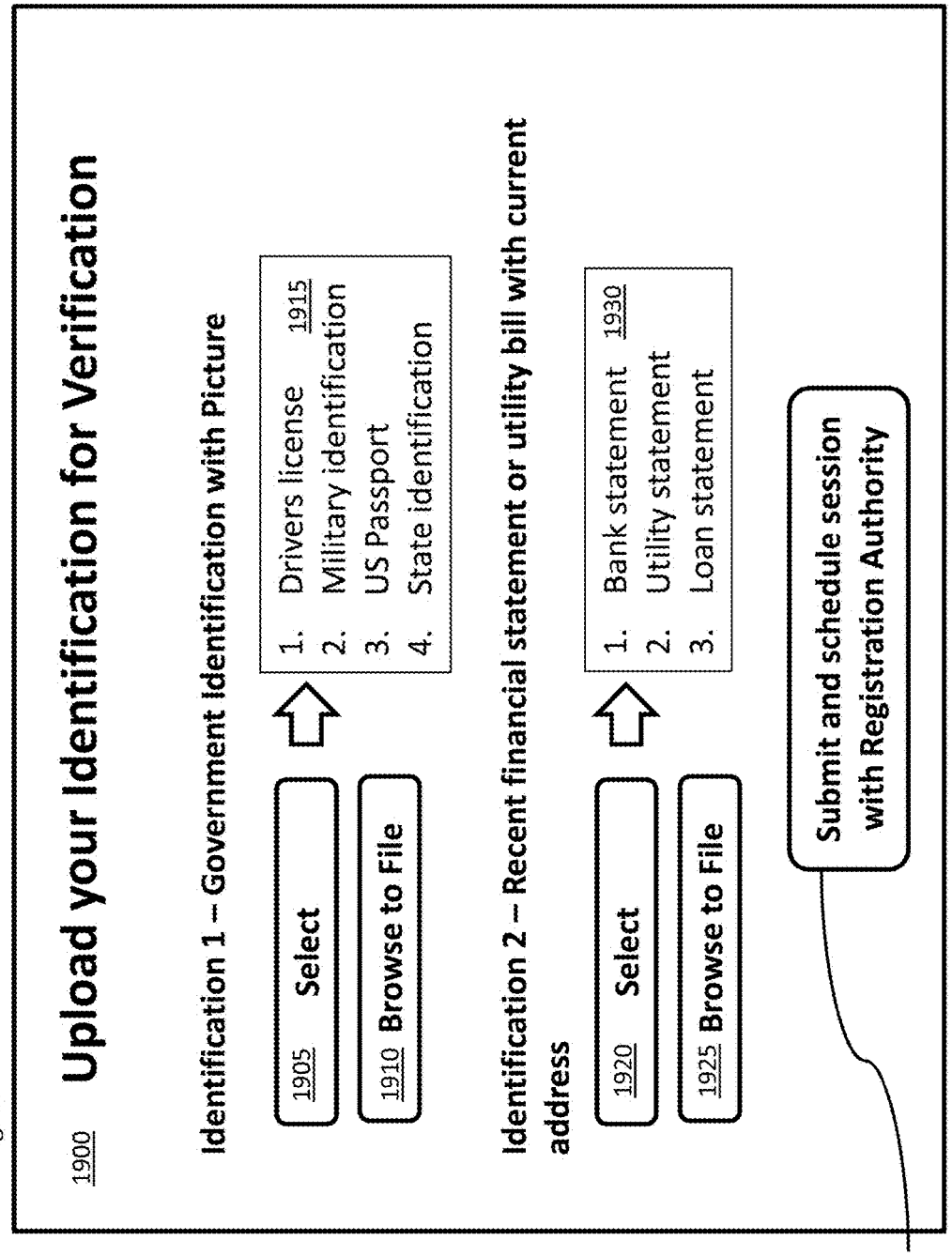

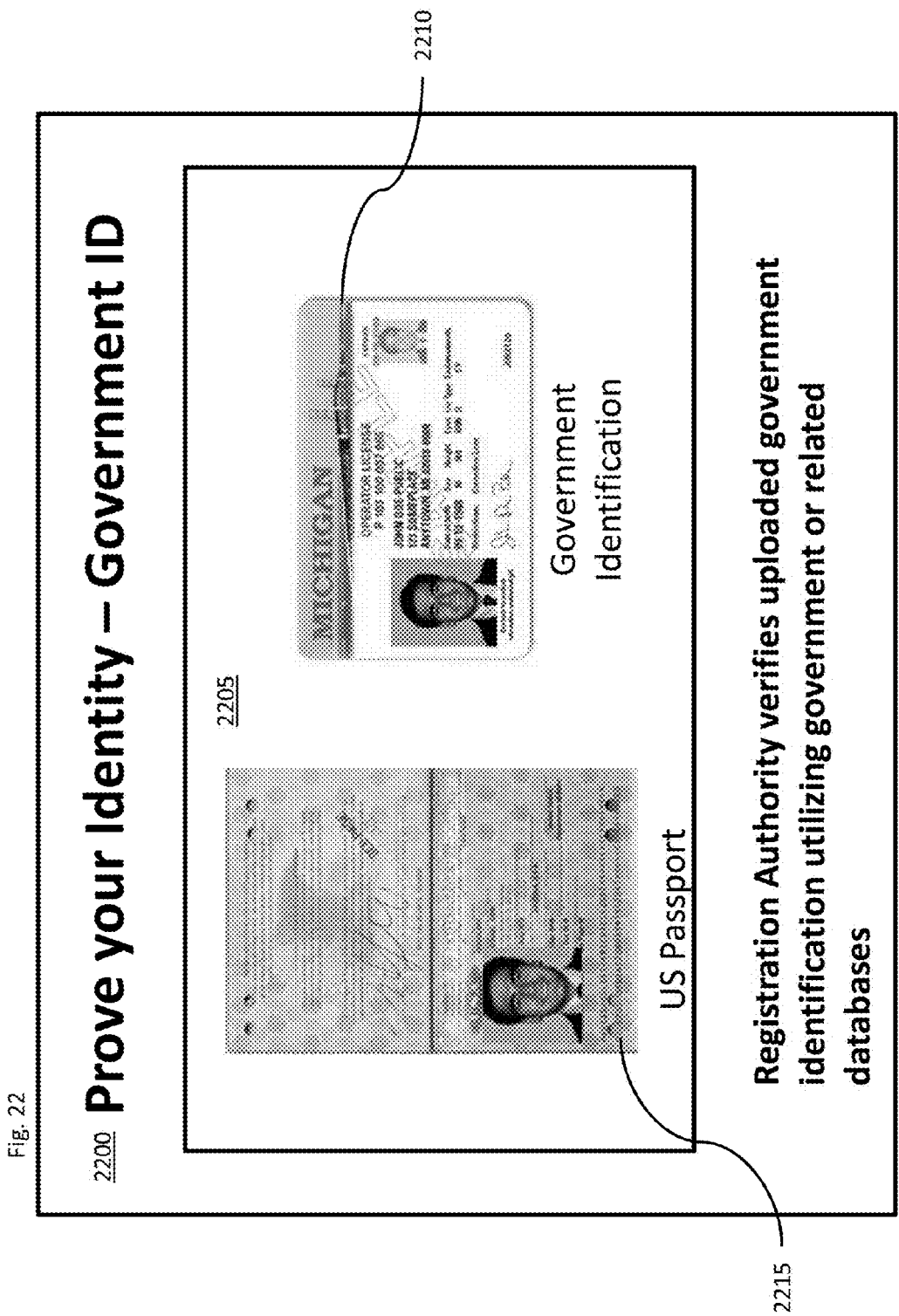

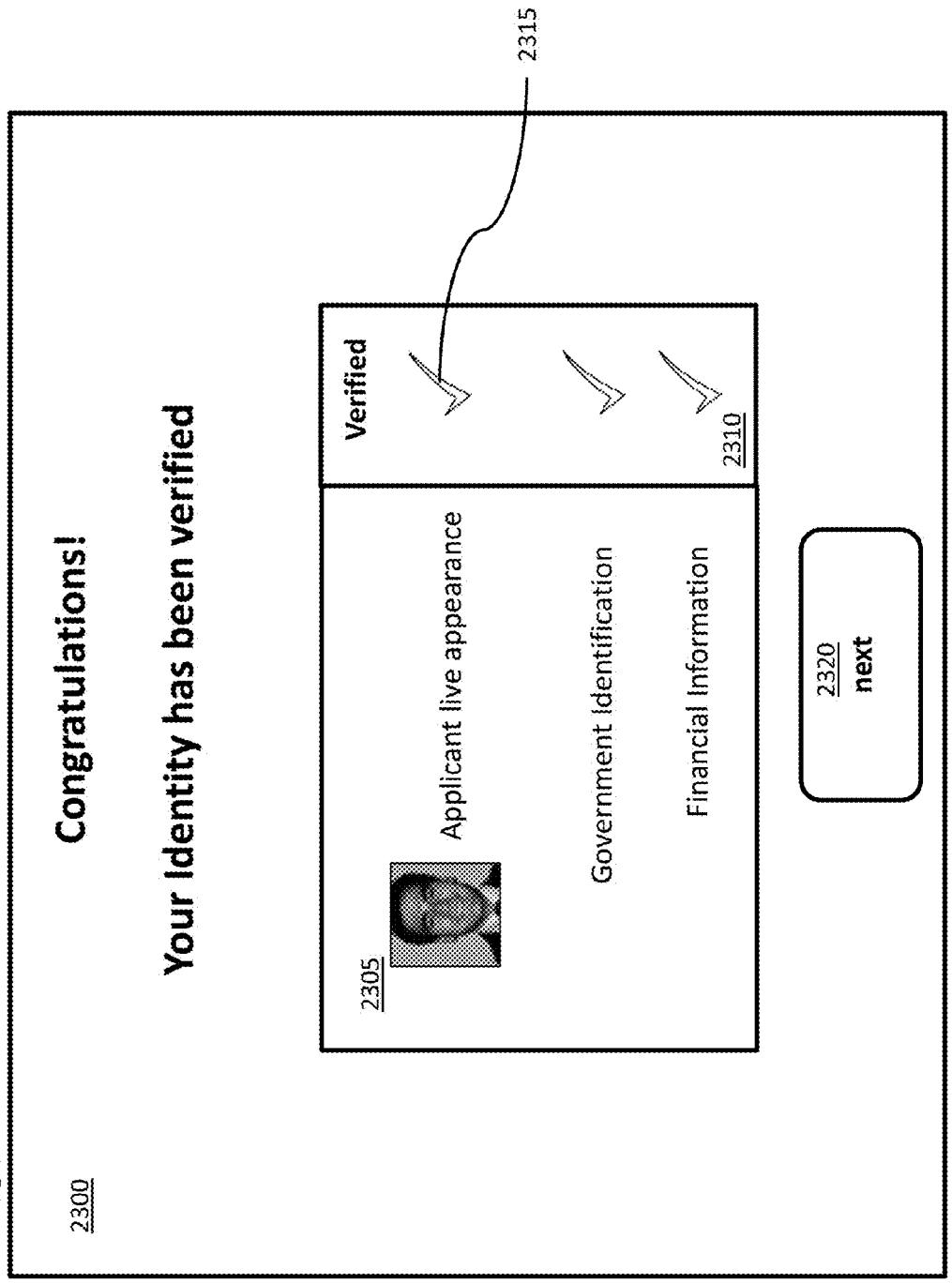

Fig. 24

Signed Identity Proofing Form

2400    This form has been pre-populated from previous questions

| First name | ~~~~~~~~~~~~~~~~ |
| Middle initial | ? |
| Last name | ~~~~~~~~~~~~~~ |
| Street address | #### ~~~~~~~~~~ |
| City | ~~~~~~~~~ |
| State | ~~ |
| ZIP | ##### |
| Email address | ~~~~~~~~~~@~~~~~~~ |
| Date of Birth (mm-dd-yyyy) | ##/##/#### |
| Cell phone number | ###-###-#### |
| Last 4 of SSN | #### |
| *NPI (National Provider Identifier) (optional field) | ########## |

Digital and Visual Notary Seal applied if applicable — 2410

*Applicant Signature* — 2405

Applicant Signature

Applicant digitally signs LOA3 compliant form with Registration Authority witness

- Record identification type presented
- Time Stamp of agreement to T&C

Completion triggers automated workflow APIs to send completed forms, digital token and metadata to trusted identity issuance service

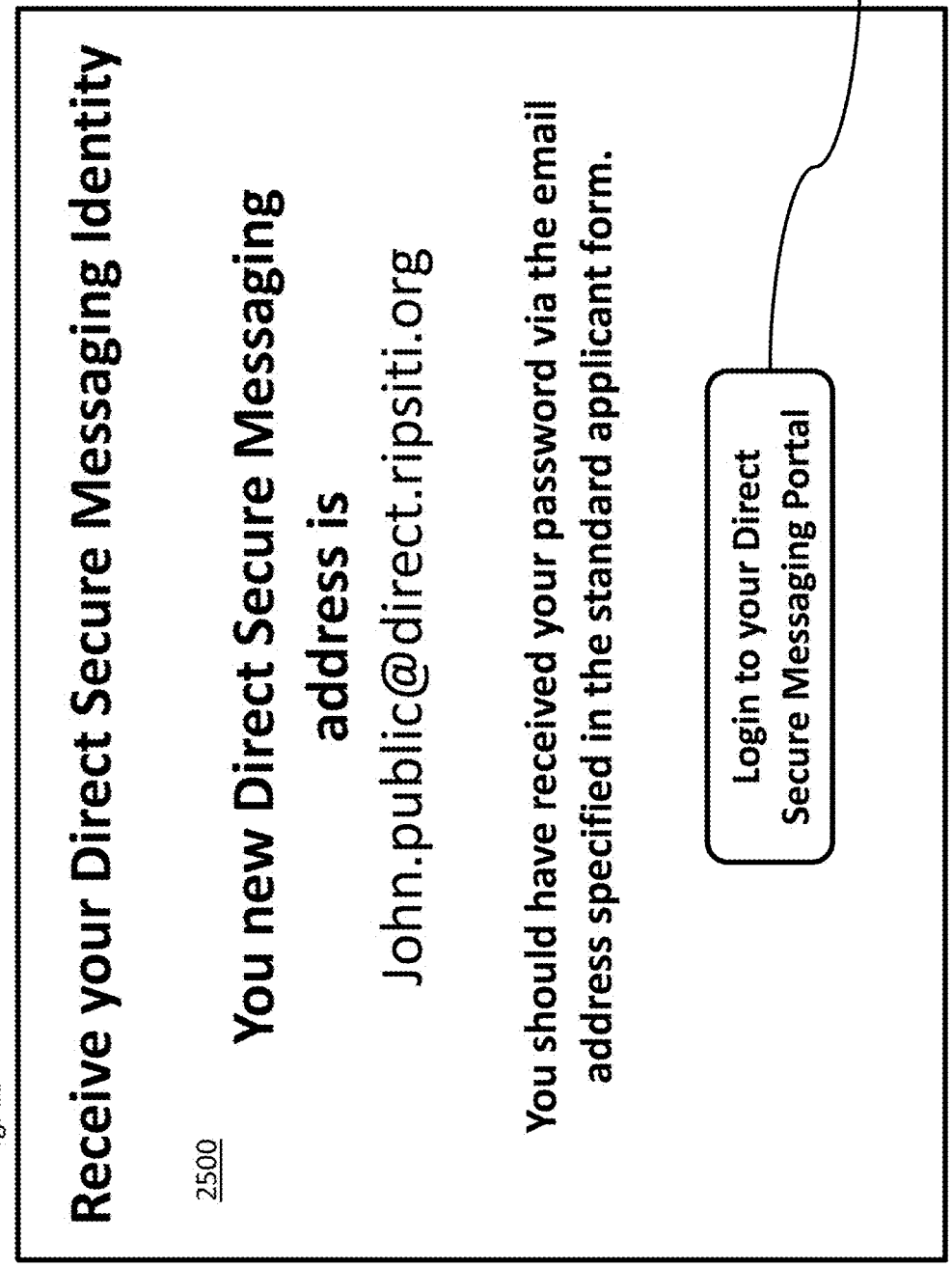

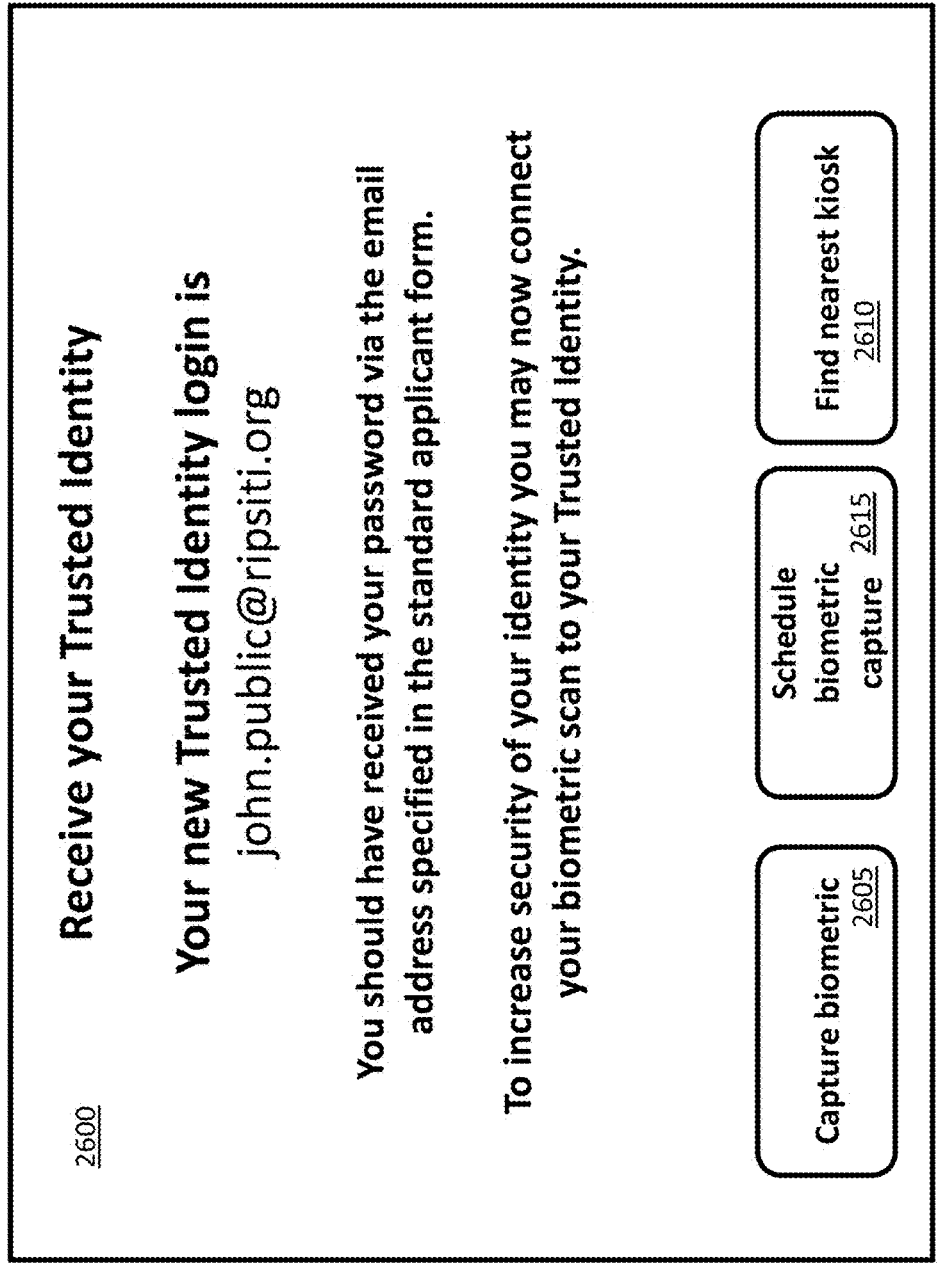

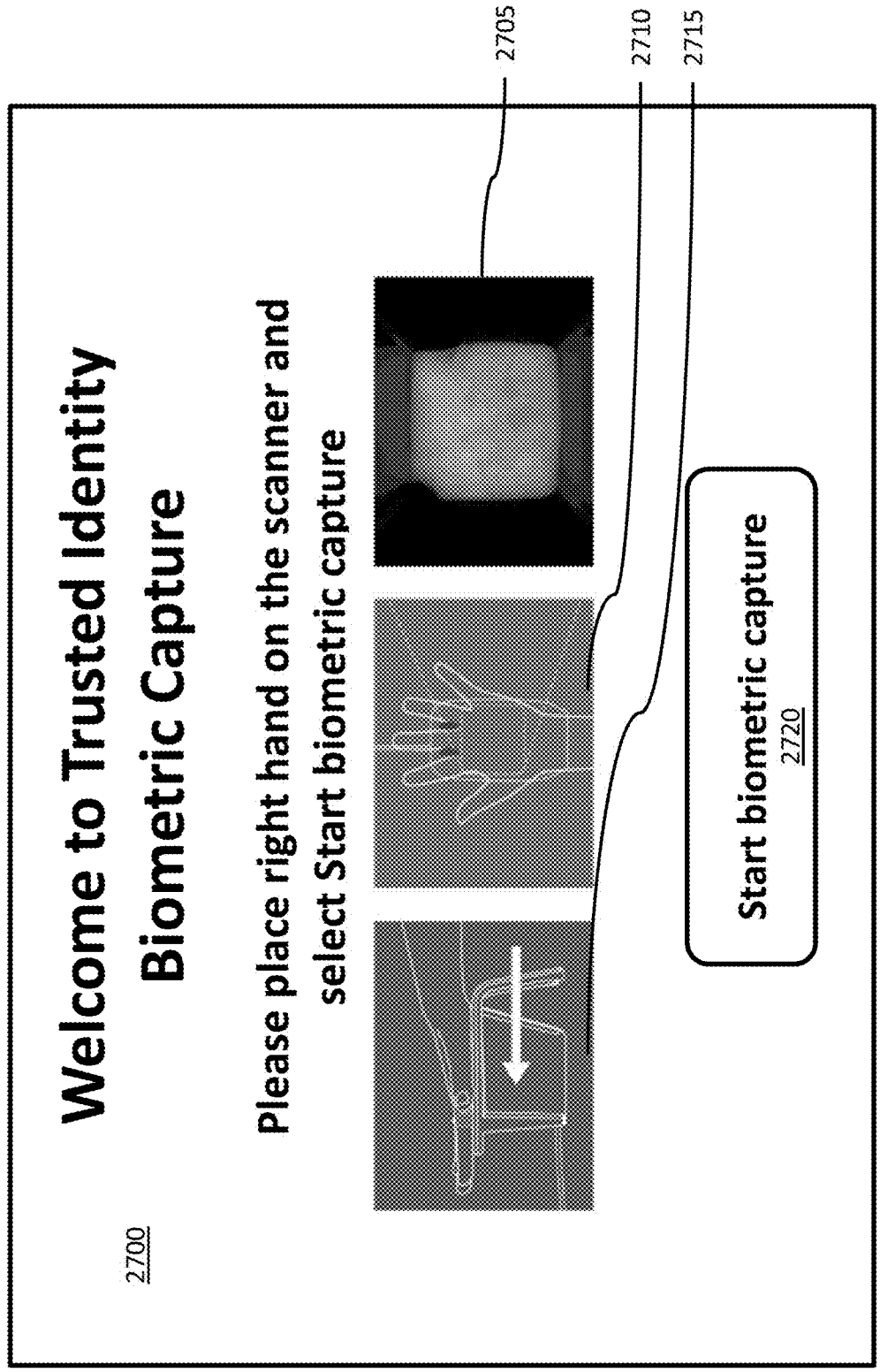

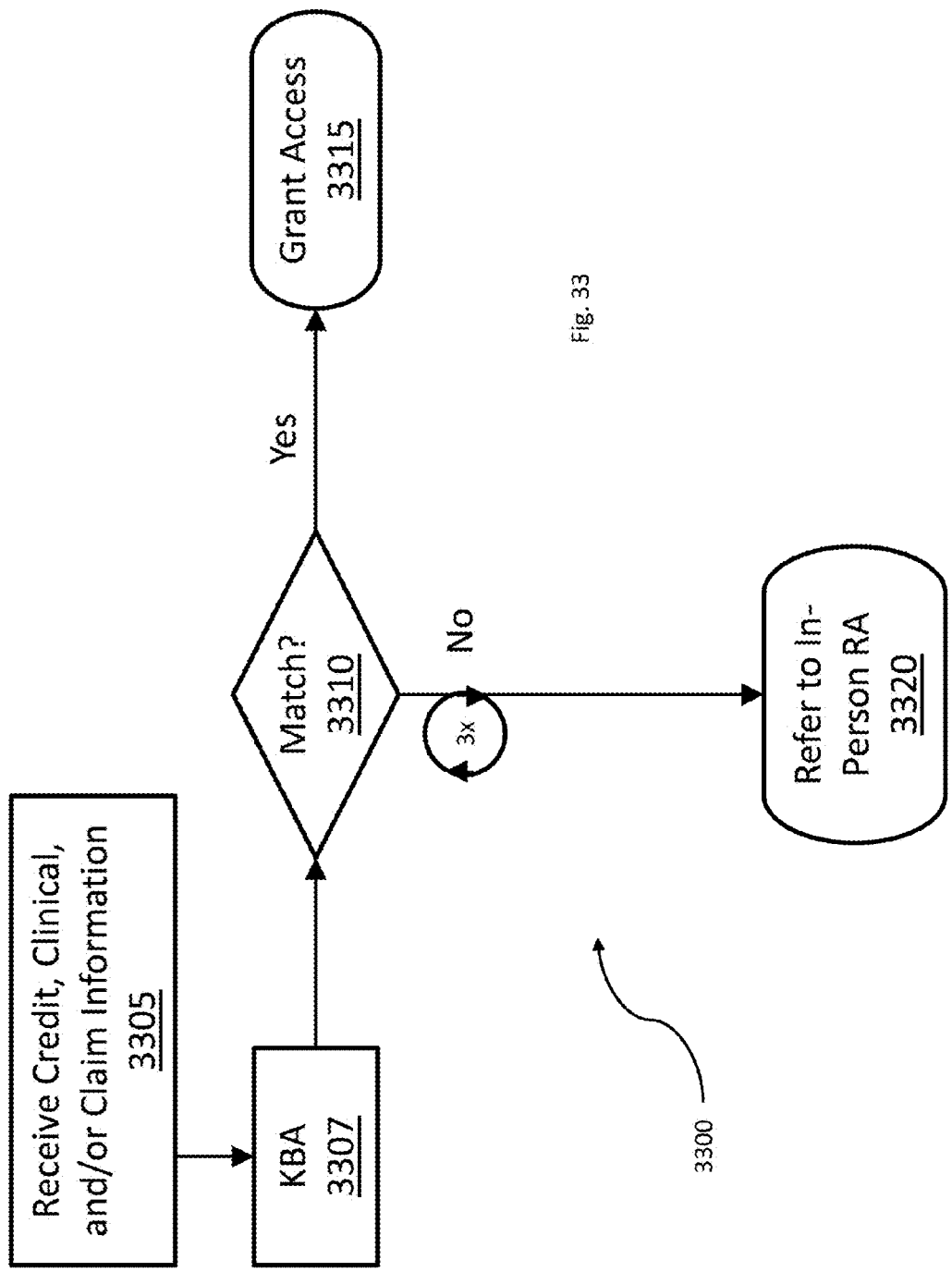

SYSTEM AND METHOD FOR IDENTITY PROOFING AND KNOWLEDGE BASED AUTHENTICATION

CROSS-REFERENCE TO RELATED PATENT APPLICATIONS

This application is a continuation-in-part (CIP) application of and claims priority to U.S. patent application Ser. No. 15/345,142 filed on Nov. 7, 2016 which is a continuation of U.S. application Ser. No. 14/949,395, filed on Nov. 23, 2015, now granted as U.S. Pat. No. 9,491,160, which is a continuation-in-part (CIP) application of Ser. No. 14/642,092 filed on Mar. 9, 2015, now granted as U.S. Pat. No. 9,197, 638, and U.S. patent application Ser. No. 14/643,910, filed on Mar. 10, 2015, the entire contents of each of which are incorporated herein by reference.

BACKGROUND

In many industries, such as health care, banking, and finance, the protection and ensuring of a person's privacy is often considered a top priority. In certain cases, ensuring privacy may also be mandated by law. Thus, various health care services, providers, and stakeholders (i.e. a doctor, nurse, or the like) may implement processes and methods that ensure that a person's Protected Health Information (PHI) is secure and shared with the actual person whose health the information is about. In the banking, credit, and finance industries, both Protected Individual Information (PII) and Protected Credit Information (PCI) are secured and shared with the person to whom the information belongs. PHI, PII, and PCI are of great value and can be targets for theft by hackers who can resell the information.

In the present health care industry, various health care services exist that allow a care giver, a hospital, or other relevant health care provider stakeholder to provide services to a patient. In providing health care, the various stakeholders may access private information about a patient or a group of patients and their Protected Health Information (PHI) and Protected Identity Information (PII) in order to provide the health care services. Other service-oriented industries are similar, such as a teller accessing the PII or Protected Credit Information (PCI) of a bank customer, or a credit authorization agent verifying the PII and PCI of a credit card user to permit a financial transaction to be completed.

The services to retrieve and access PHI, PCI and PII may be guarded by one or more security firewalls, each of which requires an authentication process to get beyond to access the information. The authentication process may be referred to in healthcare or other industries as authentication, identity authentication, or identity verification.

SUMMARY

A illustrative method according to a set of instructions stored on the memory of a computing device includes receiving, by a processor of the computing device, a request to verify an identity from an applicant device. The method also includes receiving, by the processor, a request to verify an identity from an applicant device, wherein the request comprises an applicant identification and an application identification for an application to which access is desired. Further, the method includes receiving any combination of credit-based, clinical-based, and/or claims-based information corresponding to an applicant identified in the received request, and sending to the applicant device, one or more queries related to the received combination according to one or more identity proofing requirements. The method also includes receiving, from the applicant device, one or more responses to the one or more queries, wherein the one or more responses comprise authentication information. The method also includes determining a match between the authentication information and the received combination of any of credit-based, clinical-based, and/or claims-based information; and, based on the determination of the match, granting access to the desired application to the applicant device.

An illustrative non-transitory computer readable medium having instructions stored thereon that, upon execution by a computing device, cause the computing device to perform operations. The instructions include instructions to receive a request to verify an identity from an applicant device, wherein the request comprises an applicant identification and an application identification for an application to which access is desired; instructions to receive any combination of credit-based, clinical-based, and/or claims-based information corresponding to an applicant identified in the received request; instructions to send to the applicant device, one or more queries related to the received combination of any of credit-based, clinical-based, and claims-based information according to one or more identity proofing requirements; instructions to receive from the applicant device, one or more responses to the one or more queries, wherein the one or more response comprise authentication information; instructions to determine a match between the authentication information and the received combination of any of credit-based, clinical-based, and claims-based information; and instructions to grant access to the desired application to the applicant device based on the determination of the match.

An illustrative apparatus includes a memory, a processor coupled to the memory, and a first set of instructions stored on the memory and configured to be executed by the processor. The processor is configured to receive a request to verify an identity from an applicant device. The request comprises an applicant identification and an application identification for an application to which access is desired. The processor further receives any combination of credit-based, clinical-based, and claims-based information corresponding to an applicant identified in the received request; sends to the applicant device, one or more queries related to the received combination of any of credit-based, clinical-based, and claims-based information according to one or more identity proofing requirements; receives from the applicant device, one or more responses to the one or more queries, wherein the one or more response comprise authentication information; determines a match between the authentication information and the received combination of any of credit-based, clinical-based, and claims-based information; and, based on the determination of the match, grants access to the desired application to the applicant device.

BRIEF DESCRIPTION OF THE DRAWINGS

Illustrative embodiments will hereafter be described with reference to the accompanying drawings.

FIG. 4A is a figure representing a user interface illustrating an upload user interface that may be used in accordance with an illustrative embodiment.

FIG. 4B is a figure representing a user interface illustrating a configuration user interface that may be used in accordance with an illustrative embodiment.

FIG. 5 is a figure representing a user interface illustrating an identity entry user interface that may be used in accordance with an illustrative embodiment.

FIG. 6 is a figure representing a user interface illustrating a knowledge based authentication user interface that may be used in accordance with an illustrative embodiment.

FIG. 7 is a figure representing a user interface illustrating a registration authority scheduling user interface that may be used in accordance with an illustrative embodiment.

FIG. 8 is a figure representing a user interface illustrating a real time interaction with a registration authority user interface that may be used in accordance with an illustrative embodiment.

FIG. 11 is a figure representing a user interface illustrating a registration authority electronic signature certificate on a verification form user interface that may be used in accordance with an illustrative embodiment.

FIG. 13 is a figure representing a user interface illustrating a remote identity proofing user interface that may be used in accordance with an illustrative embodiment.

FIG. 14 is a figure representing a user interface illustrating a terms and conditions user interface that may be used in accordance with an illustrative embodiment.

FIG. 16 is a figure representing a user interface illustrating an identity information entry user interface that may be used in accordance with an illustrative embodiment.

FIG. 17 is a figure representing a user interface illustrating a an identity information verification user interface that may be used in accordance with an illustrative embodiment.

FIG. 18 is a figure representing a user interface illustrating a knowledge based authentication user interface that may be used in accordance with an illustrative embodiment.

FIG. 19 is a figure representing a user interface illustrating an information upload user interface that may be used in accordance with an illustrative embodiment.

FIG. 22 is a figure representing a user interface illustrating a registration authority uploaded items review user interface that may be used in accordance with an illustrative embodiment.

FIG. 23 is a figure representing a user interface illustrating an identity confirmation user interface that may be used in accordance with an illustrative embodiment.

FIG. 24 is a figure representing a user interface illustrating a signed form user interface that may be used in accordance with an illustrative embodiment.

FIG. 25 is a figure representing a user interface illustrating a login portal user interface that may be used in accordance with an illustrative embodiment.

FIG. 26 is a figure representing a user interface illustrating an initial biometric capture user interface that may be used in accordance with an illustrative embodiment.

FIG. 27 is a figure representing a user interface illustrating a biometric capture instruction user interface that may be used in accordance with an illustrative embodiment.

FIG. 33 is a flow diagram illustrating a process for automated identity proofing using any combination of credit-based, clinical-based, and/or claims-based identity information and KBA in accordance with an illustrative embodiment.

DETAILED DESCRIPTION

Figure 1:
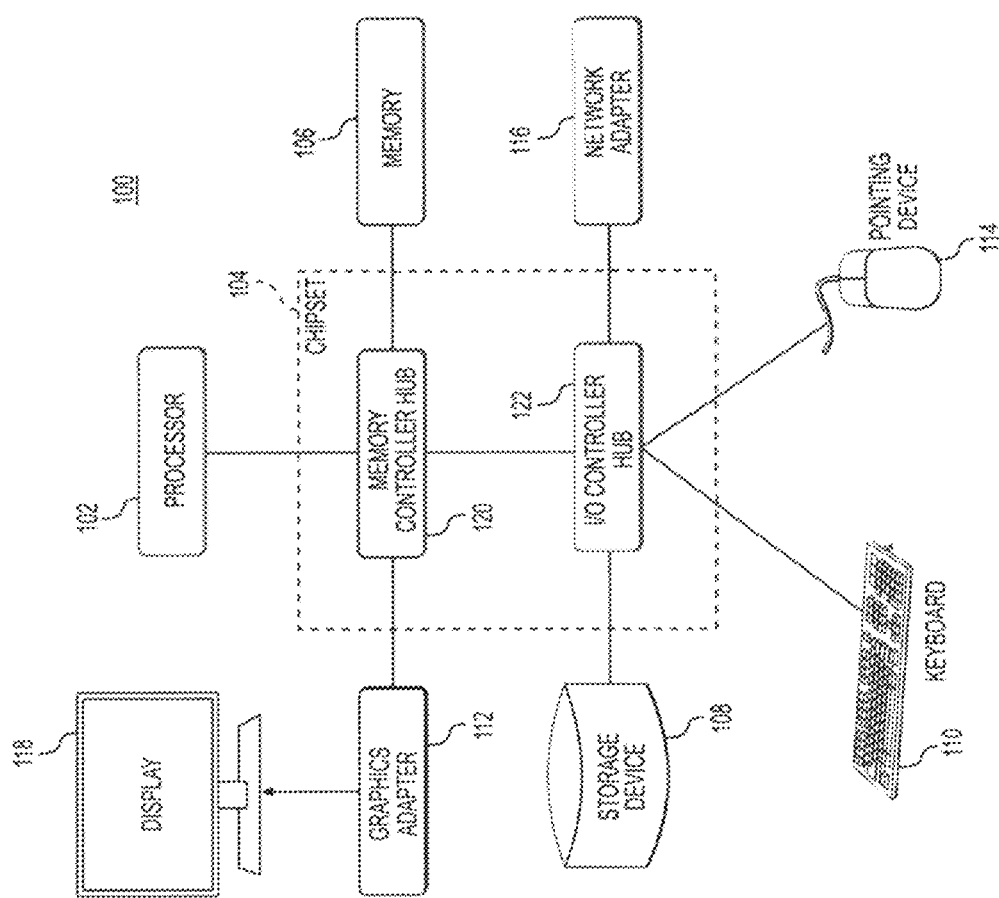
FIG. 1 is a block diagram illustrating an example computer in accordance with an illustrative embodiment.

Disclosed herein are systems and methods, which can be realized in software, hardware, or a combination thereof, to provide a remote identity proofing service and issue trusted identities (RIPSITI). Identity proofing is a process by which a registration authority collect and verify information about a person for the purpose of issuing credentials to that person. A registration authority is trusted entity that establishes and vouches for the identity or attributes of an applicant. In an illustrative embodiment, an applicant for a trusted identity may use a computer or other device as disclosed herein and request to have their identity verified in order to receive a trusted identity. Trusted identities are used in many various industries and for many varying purposes. For example, industries that utilize trusted identities may include banking and financial management, governmental agencies, health care institutions or systems, etc. Any industry that utilizes or has access to private or protected data/information may use trusted identities to manage that data/information and control access to that data/information.

In some embodiments, trusted identities may be issued according to a governing law, standard, or guideline. The systems and methods disclosed herein can be utilized in a way that is fully compliant with various identity proofing standards and policies. As just one example, standards for identity proofing such for any industry are described in National Institute of Standards Technology (NIST) 800-63-2. As another example, industry-specific policies may also be applied using the methods and systems disclosed herein. For example, industry specific standards may be specified for healthcare by DirectTrust and/or the National Association for Trusted Exchange (NATE)-Trust. Other standards that may be used include standards specified by the Kantara Initiative, such as identity assurance standards.

In an illustrative embodiment, after lower level forms of identity proofing are remotely performed, such as antecedent assertions and knowledge based authentication (KBA), the system can also remotely perform more advanced forms of identity proofing such as remote verification of photo identification, government issued identification, and signing using networked capabilities such as remote registration authorities and electronic signature and certificate capabilities. An illustrative embodiment can perform all of these remote identity proofing steps (and/or other steps) within a flexible, customizable workflow tool that can support unlimited customizations of the remote identity proofing steps in the workflow process for end-to-end fully remote identity proofing. An illustrative system can remotely prove an identity and automatically provision and issue a trusted identity such as a trusted credential, an address for secure simple mail transfer protocol (SMTP) email such as Direct (i.e. an account required to log in to utilize Direct to send secure emails containing protected information), a secure text address, or a unique trusted login id and one-time password for which can be federated for single sign-on (SSO) with other trusted Identity providers and service providers. A single sign-on (SSO) can be utilized to access many various databases and types of protected information that would otherwise utilize separate sign-ons. For example, an SSO can be used to access living will databases, electronic medical records databases for health providers and/or patients, billing records, and more. The system can also inspect video images of photo identities using scanning hardware and software to automatically detect indications of fraud or forgery, making the system better and more trusted than human, face-to-face identity proofing. The system can also utilize voice or facial recognition including image processing, pattern recognition, and other artificial intelligence techniques to remotely match voice and photo captures and photo identities with trusted databases.

In another illustrative embodiment, the system can automatically connect with trusted databases such as government licensing databases for identity lookups including, but not limited to, driver's licensing and passport databases. The system may also include a designated remote identity proofing stations that utilizes scanners to read magnetic stripes and/or embedded RFID from a trusted identity card (including but not limited to drivers licenses, passports, government employee, or other identity cards issued by government or trusted organizations), and then remotely look up and verify the information from the trusted identity card.

In illustrative embodiments, the system can support identification based, antecedent knowledge, and/or knowledge-based authentication (KBA). For some identity proofing standards, KBA may be all that is needed to verify an identity. In such a scenario, access rights, a trusted identity, and/or a certificate may be granted automatically by the system once KBA is complete, and the system need not initiate a real-time communication session or interaction with a registration authority. The system can also use multiple biometric form factors for proofing, registration, recognition, and authentication such as facial images and/or patterns, palm vein patterns, iris and/or retina images, fingerprints, real-time streaming/mobile media usage patterns, real-time or near-real-time DNA matching, or any other biometric form factors. The system may be embodied as a combination of software and hardware, as a client-server system, a peer-to-peer system, web site, Software-as-a-Service, or as a pure web service with published, secure application programming interfaces (APIs) for embedding within other systems. The system may also be a combination of any of these types of systems. The embodiments disclosed herein can facilitate cost-effective and accurate methods of identity proofing and/or issuance of trusted identities by making these processes fully remote and reliable.

In one embodiment, real-time streaming/mobile media usage patterns may be used for identity verification. For example, a system for remote identity verification may utilize global positioning system (GPS) data or similar data (such as cellular triangulation) that has been collected by a mobile device that is requesting a certificate or otherwise requesting access to protected and/or confidential records. In doing so, the system may determine whether the mobile device being used has frequented addresses or their associated GPS locations that are associated with the purported individual requesting the access. For example, if a person named Dr. Smith is requesting access to the records on her smart phone, the system may request location data from the smart phone, and determine whether that smart phone had recently frequented known addresses associated with Dr. Smith, such as Dr. Smith's home address and the address where she works.

Such identity proofing can be used to authorize access (by issuing a trusted identity and thereby allowing single sign-on (SSO)) to various types of protected information. Mandates or laws may affect the protection of this information, including the storage and access to that information. For example, in the United States, certain federal statutes apply to the management of healthcare information (e.g., the Health Information Portability and Accountability Act (HIPAA), the Health Information Technology for Economic and Clinical Health Act (HITECH) Act).

Protected Health Information (PHI), protected Individual Information (PII), and Protected Credit Information (PCI) can all be stored, managed, and/or secured by an illustrative embodiment. One reason to secure PHI, PII, and PCI is that hackers may attempt to access, user, and/or sell the data. Hackers may sell a person's PHI for much more (e.g., fifty times more) than the value of their PII or PCI, because PHI is more easily used for complete identity theft which is much more valuable than PII or PCI. Accordingly, entities storing PHI may have more secure systems that entities storing merely PII and/or PCI. One example of an industry where PHI is stored is the healthcare industry.

The services to retrieve and access PHI, PCI and PII may be guarded by one or more security firewalls, each of which requires an authentication process to get beyond to access the information. The authentication process may be referred to in healthcare or other industries as authentication, identity authentication, or identity verification. An authentication process to access a person's information may include being prompted to enter a password and/or login information, undergoing an authentication process using questions and answers or a form of biometric identification. Instead of authenticating each time someone wishes to access information, the systems and methods disclosed herein provide for establishing and issuing a trusted identity of an individual that can be used to repeatedly access information in the future without having to re-authenticate each time.

Once successful authentication has occurred, the stakeholder accessing protected information about persons may be granted an unencumbered access to information. In another example, the stakeholder may be granted access to a portion of the stored information. In yet another example, a less onerous second authorization process is used to access to more information than is initially available. In another example, accessing or sharing different information might utilize different types or levels of authorization processes. In one example, access might be directed towards accessing a patient's complete health history (protected under federal HIPAA regulations). The authentication process to access this type of information may utilize a high level of trust or credentials that the service provider accessing the information is really the person with permission for the access. Similarly, the system may facilitate sharing the information with the consumer or patient to whom the information actually belongs, such as sharing a patient's lab test results with the patient or sharing a credit card statement with a consumer.

For example, one secure way to share protected information electronically is a form of electronic mail based on The Direct Project called Direct Secure Messaging (DSM). DSM is a secure form of the Simple Mail Transfer Protocol developed specifically for use in the health care industry. In order to obtain a trusted account for using Direct from an accredited vendor, an applicant may provide proof of their identity, a process referred to herein as identity proofing. An illustrative method for identity proofing may include the applicant providing photographic identification to a witness who signs a statement which may then be signed. The witness visually verifies from the photographic identification information that the photo matches the appearance of the person whose identity is being proved. This type of identity proofing may be applied may be applied to other identity proofing and authentication/verification processes in health care or other industries.

The National Institute of Standards and Technology (NIST), has established various standards defining levels of trust for trusted identities. NIST refers to these standards as Level of Assurance or LOA. Conventionally, several of these standards involve in-person identity proofing, lookup processes associated with government-issued identity cards, and several other forms of processes to ensure that the requesting party is proven to be who they claim to be before they can be issued a trusted identity.

As noted above, NIST refers to each standard level of trust as a Level of Assurance (LOA). NIST has established various numbers associated with the LOA depending on how rigorous a party desires the authentication process to be. These range from LOA 1, the weakest level of trusted identity, to LOA 4, the highest level of trust that a person possessing and using a trusted identity is authenticated as being the person to whom the trusted identity was issued. LOA 3 and LOA 4 can involve the use of biometric forms of identification such as digital fingerprints, digital scans of palm vein patterns, digital scans of the iris or retina, facial recognition, or even real-time DNA sequencing and matching.

For example, the Office of the National Coordinator ("ONC") recommends that a Direct address (i.e. an account required to log in to utilize Direct to send secure emails containing PHI, PCI, or PII) only be given to those parties that undergo an authentication under LOA 3. The Department of Veterans Affairs authenticates identities that have been proofed at LOA 3. In this scenario once a party has undergone the requirements under LOA 3 (i.e. proving their identity), a service granting a trusted identity to access medical services via the Direct Protocol may send the verified party a trusted identity. Some other organizations in healthcare may accept a lower level of trust, LOA 2. A leading industry consortium consisting of most of the vendors which offer Direct, called DirectTrust.org, has its members use a level of trust that is higher than LOA 2 but lower than LOA 3 in order to become and remain accredited to be in a trust bundle that allows persons having a Direct account from one accredited vendor to send Direct Secure messages to another person having a Direct account from a different accredited vendor of Direct accounts.

Thus, in healthcare or in any other industry, in order to ensure that a trusted identity is distributed to a correct and verified party, an issuing trusted identity service may mandate that a requesting party prove the identity of each person applying for an account via the established level of assurance associated with the service being rendered.

For example, for the Direct Protocol, the established standard employed is generally either LOA 2, LOA 3, or somewhere in between these two levels of assurance. As noted above, identity proofing can involve the presentation of the adequate documentation, such as a government issued identification (ID), and a verification that the party presenting the government ID is the party associated with the presented or uploaded government ID.

However, such methods of identity proofing may cause an unwanted delay in receiving a trusted identity to access relevant health care applications and services. For example, in medicine, any sort of delay may affect the quality of care given to a patient. For example, if a stakeholder forgets a password, or is temporarily blocked from services, the process of re-establishing a trusted identity may be onerous, and ultimately, frustrate a stakeholder's ability to provide service. In other words, a stakeholder may have to go through the process of presenting identification and having it verified and signed, which can be time consuming and inconvenient, particularly if it includes an in-person verification.

In an illustrative embodiment, a trusted identity is used to gain access to a variety of health care information. The trusted identity may be mandated due to a governmental regulation, and further, may utilize a pre-established set of criteria to 1) obtain the trusted identity; or 2) re-obtain information about the trusted identity. For example, if a doctor forgets or loses a password or trusted identity file required for authentication, the doctor is required to re-obtain the password or trusted identity file.

As noted above, to get a trusted identity, a doctor or stakeholder physically presents the required information (for example, the requirements mandated by LOA 3). This can be time consuming, costly, and a hindrance to the overall quality of health care provided. Instead, the doctor may utilize the methods and systems disclosed herein to get a trusted identity more easily. Such methods include remotely authenticating a party for health care related services. By employing the aspects disclosed herein, the process to provide trusted identity and re-certify the party may become seamless. The systems and methods disclosed herein are more efficient than having to find an agent to verify and cross-reference the information provided for verification to obtain or re-obtain a trusted identity. Because the aspects disclosed herein are remote and automatic, the prior delays caused by in-person verification are obviated.

FIG. 1 is a block diagram illustrating an example computer 100 in accordance with an illustrative embodiment. The computer 100 may be any computing machine, such as a tablet, smart phone, laptop computer, desktop computer, server, remote client device, gaming device, smart television device, wearable computer, or any combination thereof. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term module refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone, wearable computer, or any sort of computing element. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server. The computer 100 may be clustered with other computer 100 devices to create the server. The various computer 100 devices that constitute the server may communicate with each other over a network.

As would be appreciated by one of ordinary skill in the art, the embodiments disclosed herein may be implemented on any system, network architecture, configuration, device, machine, or apparatus, and is not to be construed as being limited to any specific configuration, network, or systems, even though an example system is shown and described with respect to FIG. 1. The embodiments herein may be suitably implemented on conventional computing devices, for example, computer workstations, on Internet based applications, on optical computing devices, neural computers, biological computers, molecular computing devices, and other devices. As may be appreciated by those skilled in the art, the present systems and methods, in short, may be implemented on any system, automaton, and/or Turing machine.

An automaton is herein described as a mechanism that is relatively self-operating and designed to follow a predetermined sequence of operations or respond to encoded instructions. A Turing machine is herein described as an abstract expression of a computing device that may be realized or implemented on an infinite number of different physical computing devices. Examples of systems, automatons and/or Turing machines that may be utilized in performing the process of the present methods and systems include, but are not limited to: electrical computers (for example, an International Business Machines (IBM) personal computer); neuro-computers (for example, one similar to the "General Purpose Neural Computer" described in U.S. Pat. No. 5,155,802, issued to Paul H. Mueller, on Oct. 13, 1992); molecular computers (for example, one similar to the "Molecular Automata Utilizing Single or Double-Strand Oligonucleotides" described in U.S. Pat. No. 5,804,373, issued to Allan Lee Schweiter et al., on Sep. 8, 1998); biological computers (for example, one similar to the biological computer presented by Ehud Shapiro, of the Computer Science and Applied Mathematics Department at the Weizman Institute of Science (Rehovot, Israel), at the Fifth International Meeting on DNA-Based Computers); and optical computers. For purposes of simplicity, such devices hereinafter are referred to as computers, as is commonly understood in the art. But, the embodiments disclosed herein are not limited being applied to such devices and may be accomplished upon any system or collection of systems capable of providing the features and functions identified herein.

Methods, processes, and software are disclosed herein that remotely prove the identity of individuals fully compliant with identity proofing standards and policies, especially standards such as NIST 800-63-2 LOA1-3, DirectTrust, and/or NATE-Trust. The methods, processes, and software may utilize photo identification and government identities using networked capabilities and capabilities within a process for end-to-end fully remote identity proofing followed by the automated provisioning and issuance of a trusted identity and optional credentials. In alternative manifestations the methods, processes, and software use automated government identity lookups including but not limited to digital imagery equipment with artificial intelligence and pattern recognition to detect fraudulent physical identification articles remotely, electronic scans of magnetic stripes and other electronic markers on government-issued identification media including but not limited to drivers licenses, government employee identities, passports, or other government-issued identities combined with real-time lookup in trusted databases. In alternative manifestations the methods, processes, and software support identification based on antecedent knowledge and/or knowledge-based authentication. In alternative manifestations the methods, processes, and software use multiple biometric form factors for proofing, registration, recognition, and authentication such as facial images and patterns, palm vein patterns, iris and/or retina images, fingerprints, real-time streaming/mobile media usage patterns, real-time or near-real-time DNA matching, or any other biometric form factors. The methods, processes, and software disclosed herein can be manifested in software and/or hardware as a client-server system, a peer-to-peer system, web site, software-as-a-service, or as a pure web service with published, secure application programming Interfaces (APIs) for embedding within other systems. These methods, processes, and software replace cost-ineffective and failure-prone face-to-face identity proofing with fully remote and more reliable, cost-effective identity proofing.

Figure 2:
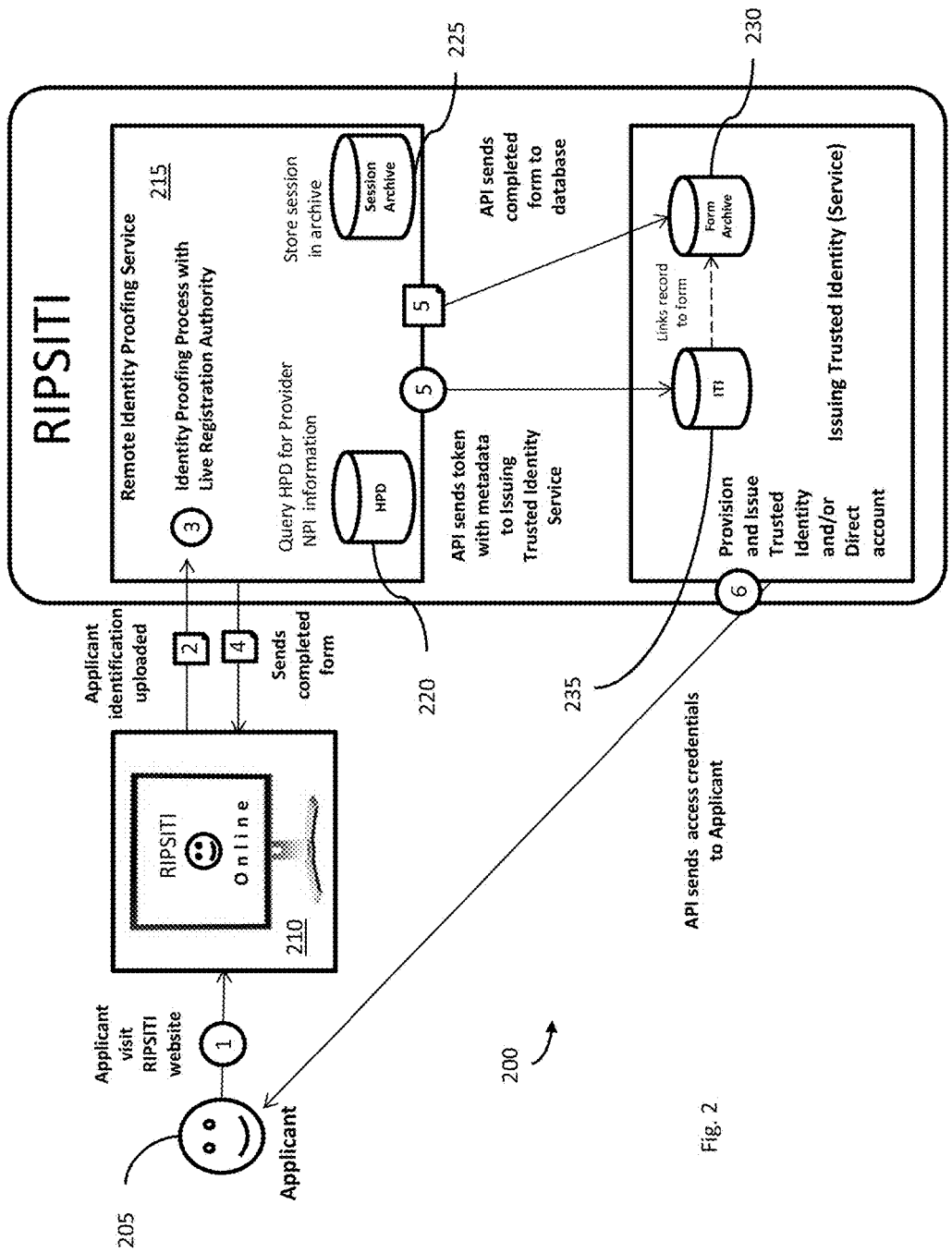
FIG. 2 illustrates an example of a method for remotely verifying an identity in accordance with an illustrative embodiment.

FIG. 2 illustrates an example of a method 200 for remotely verifying an identity in accordance with an illustrative embodiment. In alternative embodiments, fewer, additional, and/or different operations may be performed. Also, the use of a flow diagram is not meant to be limiting with respect to the order of operations performed. The method 200 may be performed partially or wholly on a processor, such as the one described above with regards to computer 100.

In an operation 1 of the method 200, an applicant 205 visits the remote identity proofing service and issuing trusted identity (RIPSITI) website 210. The website may be accessed through a personal computer, mobile computer, wearable computer, tablet computer, laptop computer, or any other device capable of being connected to the remote identity service on the internet or other network. In this embodiment, the device applicant is using is referred to as an applicant device. The device may not be owned by the applicant, but is nonetheless referred to herein as the applicant device. The applicant device may be a personal computer, laptop, smart phone, wearable computer, kiosk, tablet computer, etc. Furthermore, in alternative embodiments, the RIPSITI may not be a website, and may instead be a specific software application stored on a computing device. In any of the disclosed embodiments, the applicant device may access and utilize a communications network such as the internet in order to communicate with other devices, such as one administrating or storing the RIPSITI.

Using the applicant device and the website 210, the applicant 205 can request to verify an identity. The request to verify an identity may also take the form of a request for a trusted identity and/or direct account. The request is sent to the remote identity proofing service 215. The request may also include information from or about the applicant in order to prove the applicant's identity. Such information may be entered into forms, answered questions, uploaded documents, etc.

In an operation 2, the applicant uploads identification information for use in the identity proofing and verifying by the registration authority. The identification information may include a government issued identification, for example. In an illustrative embodiment, the remote identity proofing service (RIPS) 215 may also determine the requirements for the identity proofing. For example, the RIPS 215 may determine the requirements based on the request from the applicant. That is, what the applicant is requesting is relevant in determining how and what should be shown to meet different identity proofing standards. In another embodiment, the identity proofing requirements may be pre-determined before an applicant requests identity proofing and a trusted identity. In yet another alternative embodiment, the system may have multiple pre-determined identity proofing requirements (such as ones that correspond with varying levels of assurance (LOAs) and the system will match a pre-determined identity proofing requirement with a request when the system receives the request. In these ways, the system can determine what steps are involved and what information and proof of identity is used to perform the identity proofing. In alternative embodiments as disclosed herein, identification information or documents may not be uploaded by the applicant. For example, identification information may be looked up in a database and/or inferred based on log in information. In another example, identification documents may be presented to a registration authority in a live video feed during a real time communication session.

In an operation 3, the system initiates a real time communication session with a live registration authority device. A person, referred to herein as the registration authority, can check the identification provided by the applicant and perform in-person verification utilizing the systems and methods as disclosed herein. For example, the real time communication session may involve audio and video between the applicant device and the registration authority (RIPSITI) device. In this way, the applicant and the registration authority can talk to and see each other, even over a long and/or physically remote distance. Thus, remote identity proofing (even under an in-person standard) is accomplished. Using the video of the real time communication session, the registration authority may check a photo identification of the applicant and compare the photo to the applicant's actual face. Accordingly, the real time communication session allows a registration authority to inspect identification information provided by the applicant, and thereby complete the identity proofing (particularly any in-person identity proofing). Other information may be used to verify an identity: a government ID cross-referenced with the person presenting the government ID—this may be authenticated via biometric scanning and/or image/video sensors used to cross-reference with an online database to secondarily authenticate; fingerprinting/biometric sensing; palm vein patterns; iris and/or retina images; real-time streaming/mobile media usage patterns; and/or real-time or near-real-time DNA matching. The system may also automatically check information entered by the applicant or about the applicant with databases, such as known property records databases, phone records, etc.

The RIPS 215 may also utilize a health provider directory (HPD) 220 and/or a session archive 225. The session archive may be utilized to store the session between the applicant and the registration authority. The session archive 225 may save some or all of a session. For example, the audiovisual feed between the applicant device and the RIPS 215 may or may not be stored. Completed forms (including signed, certified, etc.) may also be stored in the session archive 225. Other information such as personal information entered or KBA questions answered may also be stored in the session archive 225.

The HPD 220 may be utilized to populate the certain information used by the RIPS 215 to perform identity proofing. The HPD 220 is a directory of health providers. Information regarding health providers is stored along with a national provider identifier (NPI). Thus, the NPI links a health provider to their data already stored in the HPD 220. Accordingly, instead of manually entering data, the applicant may simply enter their NPI, and the RIPS 215 can query the HPD 220 for any data pertaining to the applicant. The data found can be used to populate various fields requested by the RIPS 215 to perform the identity proofing. For example, examples of such data are discussed below with respect to FIGS. 5 and 16.

Whether through information uploaded by the applicant, information received from the HPD 220, or information manually input by the applicant and/or the registration authority, a form may be completed in the process of the identity proofing. The form may also be signed by the applicant and/or the registration authority. The form may include electronic signatures or digital certificates. In some instances, the applicant may sign the form during the real time communication so it may be witnessed by the registration authority. The registration authority may digitally sign and/or apply a digital certificate to the form depending on the type of identity proofing being performed. The signature or certificate of the registration authority may represent a registration authority confirmation that the particular requirements for the identity proofing have been met. In other embodiments, the registration authority confirmation may be a different input such as checking a box, filling out a form, or any other way of verifying that the identity proofing requirements for a particular scenario have been met.

In an operation 4, the completed form is sent to the applicant device. In an operation 5, the completed form is sent to an issuing trusted identity (ITI) service 235 and to the applicant. The ITI service 235 is a part of the remote identity proofing and issuing trusted identity (RIPSITI) service. In an alternative embodiment, a remote identity proofing service and an issuing trusted identity service may be separate systems. The completed form is also sent to a form archive 230 for storage. An API may also be used to send the form to the form archive 230. The form that is sent to the ITI service 235 may be an API sending a token and metadata representing the form values. The form as it was digitally signed by the applicant and the registration authority may be sent by an API to the form archive 230. In that embodiment, the metadata may still link to or be linked to the form stored in the form archive 230. The token may be metadata, a digital certificate, an identifier, a digital or electronic representation of a system, user, identity, credential, or session, or another conveyance for sending digital or electronic information between systems, subsystems, and/or users. The token may be an access token that allows the ITI service 235 to release/issue a trusted identity to the applicant device. Accordingly, in an operation 6, the ITI service 235 issues the trusted identity and/or Direct messaging account information to the applicant 205 (or the applicant device). In this way, the applicant 205 can use the trusted identity and/or Direct messaging account information in the future without having to do identity proofing again. The trusted identity includes access credentials such as a username and a one-time password for the applicant 205 to use for the first time the trusted identity is utilized. The access credentials may be utilized in a single sign-on environment. The applicant 205 can subsequently change their password to continue using the trusted identity and single sign-on. Optionally, the system may also trigger an automated provisioning of a Direct secure messaging identity and account information including a username and temporary password. This may occur at various times, including, but not limited to, before the operation 5, after the operation 5 but before the operation 6, or may occur after the operation 6. In alternative embodiments, the trusted identity and/or Direct messaging account information may include a permanent rather than a temporary password.

Sending the trusted identity and/or Direct messaging account information to the applicant may be done in different ways. For example, one of the user name or password may be sent out of band (that is, through a different medium). For example, a user name may be displayed by the system to the applicant after identity proofing is complete (see, e.g., FIGS. 25 and 26). The password may be sent out of band to the applicant. The password may be sent through e-mail, a text message, a chat message, the Direct messaging account, fax, voice call, or any other medium of exchanging information such that the applicant has access to it. In another illustrative embodiment, the system may not display a user name to the applicant, all of the access credentials are issued to the applicant through mediums other than the remote identity proofing system.

Figure 3:
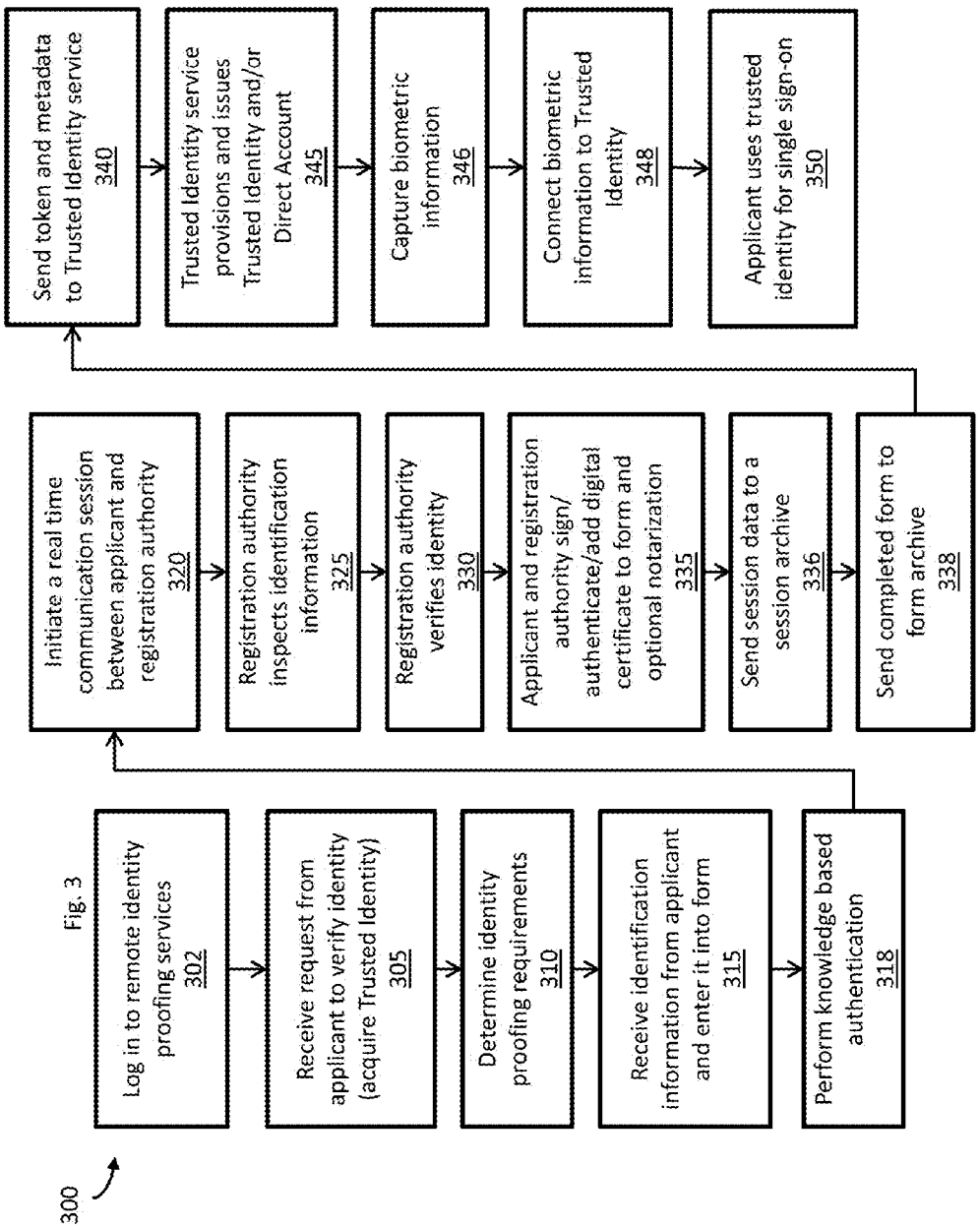
FIG. 3 is a flow diagram illustrating a method for remote form in accordance with an illustrative embodiment.

FIG. 3 is a flow diagram illustrating a method 300 for remote form in accordance with an illustrative embodiment. In alternative embodiments, fewer, additional, and/or different operations may be performed. Also, the use of a flow diagram is not meant to be limiting with respect to the order of operations performed. In an operation 302, the applicant logs in to the remote identity proofing services. An applicant may have log in information used specifically for the remote identity proofing services. In another embodiment, the applicant may use log in information of a different system that the remote identity proofing services has access to. In another embodiment, the applicant may not have log in information and would therefore not log in. In yet another embodiment, the user may set up log in information for the identity proofing services the first time using the identity proofing services. In another embodiment, the applicant may not have valid log in information and would therefore not log in. The applicant may be requested to re-enter correct log in information.

In an operation 305, a request from an applicant to verify an identity (and/or acquire a trusted identity; herein a request to verify an identity is used broadly to include within that request a request to acquire a trusted identity). The request may take various forms in various embodiments. The request may be a specific input from an applicant. The request may specify what type of identity verification the applicant seeks. The request may specify an entity the applicant is seeking a trusted identity for. The request may also be input in various ways. For example, the request may occur simply by the user logging in or otherwise accessing the remote identity services. In another example, the information in the request may be selected from a list or otherwise input by the applicant. In another example, the contents of the request may be inferred by the remote identity services. For example, the remote identity services may support multiple universal resource identifiers (URI) that all access the remote identity services. However, different URIs may indicate to the identity access what the applicant is seeking identity proofing for. That is, the request may be sent to the remote identity proofing services by virtue of the URI used.

In an operation 310, the system determines identity proofing requirements. As disclosed herein, that determination may or may not be made based on the specifics of the request to verify an identity. The identity proofing requirements may be determined based on the request to verify an identity. That is, what type of request is received may affect the requirements. Accordingly, the requirements may be determined from log in information, a URI or link used to access the services, specific inputs from the user, etc. The requirements determined may indicate what type of credentials are issued (e.g., Direct Messaging Service account, Trusted Identity), what level of assurance (LOA) or other identity proofing must be performed/verified, whether biometric information is to be captured, how captured biometric information is used or connect to the issued credentials, etc. The requirements may also indicate specific types of identity proofing to be used. In other words the system determines whether it should perform knowledge based authentication (KBA), in-person verification, biometric verification, signature matching, etc. In one illustrative embodiment, the system may not determine identity proofing requirements. In such an embodiment, the system may be configured to perform the same identity proofing for every applicant and not distinguish between different identity proofing requirements (and thus requirements would never be determined).

In an operation 315, the system receives identification information from the applicant. The applicant may enter all of their identifying information. In an alternative embodiment, an applicant may enter relatively little identifying information. For example, the system may receive an identifier such as a national provider identifier (NPI), which may be used to look up a provider/applicant in a database. Information in the database associated with the NPI can then be used to automatically populate the identification information. In another alternative embodiment, the applicant may not enter any identification information. In this embodiment the system can automatically determine the identification information. For example, if an applicant logs in, the system may determine from a known user database the identification information associated with the log in information. In an operation 318, the knowledge based authentication (KBA) as disclosed herein is performed. The identification information is entered into a form. The form may be a standard form provided by the remote identity proofing service. The form may be a specific form customized for the particular credentials to be issued or entity the credentials are being issued for. In this embodiment, the specific form may be stored and accessible by the remote identity proofing services so that the form can be used easily. If a specific form is used, the remote identity proofing services may determine the appropriate form to use based on the determined identity proofing requirements as determined in the operation 310. In an operation 320, the system initiates a real time communication session between the applicant and the registration authority.

In an operation 325, the registration authority inspects the identification information presented or uploaded by the applicant. In doing so, the registration authority can confirm the identity of the applicant as shown in an operation 330. In an operation 335, the applicant and the registration authority can sign, authenticate, and/or add digital certificates to an form. This may happen during the real time communication session or outside of the real time communication session.

In an operation 336, the system sends session data to a session archive. The session data is stored so that a record of the session is maintained by the remote identity proofing service. The session data may be different data in different embodiments. For example, the session data stored may be audio and video recordings of the session. Another example may only store video or may only store audio of the session. Video stored may be any of a recording of the interfaces displayed to the applicant and/or registration authority or actual video feeds from cameras that are recording the applicant and/or registration authority. Session data may also be data regarding the real time communication session. For example, session data may include the name of the applicant and/or registration authority, the time of day of the session, the length of the session, what credentials were issued, what level of assurance (LOA) or other identity proofing requirements applied to the session, the outcome of the session (was the identity verified?), or any other data related to the session. In one illustrative embodiment, video and audio information is not stored as session data, but the other data related to the session is. In an operation 338, the completed form is sent to an archive. As noted herein, the completed form may be a standard form or a credential/credentialing entity specific form.

In an operation 340, the system sends an token and metadata representing the contents of the form to the issuing trusted identity (ITI) service. The ITI service may be integrated into the system, or may be separate from the system. In an operation 345, the ITI service issues the trusted identity to the applicant.

In an operation 346, biometric information is captured by the system. The biometric information is then connected to the issued trusted identity in an operation 348. The applicant may now use the trusted identity to gain access to various records using single sign-on, as shown in an operation 350.

In an illustrative embodiment, the system verifies the identity of the applicant/requestor automatically as disclosed herein. For example, the system may analyze the applicant's face and entered identification information and check it against a database to verify the applicant's identity.

FIG. 4A is a figure representing a user interface 400 illustrating an upload user interface that may be used in accordance with an illustrative embodiment. In alternative embodiments, fewer, additional, and/or different elements may be present in the user interface. The various user interfaces disclosed herein may be any sort of interface, including a graphical user interface (GUI) displayed on a computing device, holographic interface, meta-glasses interface, altered reality interface, space glasses interface, audio-visual interface, augmented reality, or any other sort of interface. The user interface 400 shows various locations, such as entry 405, where information may be entered by the applicant/requestor. The entry 405 is a place where an applicant can enter an National Provider Identifier (NPI) to identify which health provider the applicant is associated with.

FIG. 4B is a figure representing a user interface 420 illustrating a configuration user interface that may be used in accordance with an illustrative embodiment. In alternative embodiments, fewer, additional, and/or different elements may be present in the user interface. The user interface 420 shows various inquiries utilized to execute an illustrative embodiment that uses live, real-time, video and audio interaction and communication between an applicant and a registration authority. As disclosed herein, the person verifying the identity of the applicant is the registration authority.

The user interface 420 shows a variety of inquiries used to configure the real time interaction or communication between the applicant and the registration authority. For example, inquiry 425 asks for information regarding a discount code. If an applicant has a promotional or other discount code, it can be entered as an answer to the inquiry 425 to ensure that discounts are applied when a client is billed or charged for the remote identity proofing service. Discounts may be any type of discount, such as a limited time promotional discount, a new applicant discount, a frequent proofer discount, a bulk or group services discount, or otherwise. In another embodiment, a discount may be applied automatically based on a known customer, and the discount code may not be entered. Other questions on the user interface 420 include inquiries about the applicants webcam, whether they have had a physical address in the United States, and whether the applicant agrees to the terms of service. The applicant is asked to enter whether or not they have a webcam, because the webcam facilitates the identity proofing process, particularly when it is used during a real-time video communication. It is also used so that the applicant can present, via the video from a webcam, various documents and/or forms of identification such as government issued identification and/or other photo identification.

As discussed above with respect to FIG. 3, the system also allows the applicant to upload files at file upload area 410. In an alternative embodiment, and as explained in the text in FIG. 4, the system also allows an applicant to upload a document later once the applicant has joined a live session with a registration authority. In another alternative embodiment, the system may have already stored forms that an applicant can populate. Such forms may be commonly used forms. In yet another embodiment, if an applicant has used the system before, old forms that have previously been uploaded may also be available for selection and editing.

FIG. 5 is a figure representing a user interface 500 illustrating an identity entry user interface that may be used in accordance with an illustrative embodiment. In alternative embodiments, fewer, additional, and/or different elements may be present in the user interface. The user interface 500 allows the applicant/requestor to enter personal information about themselves such as name, address, birthdate, and other identifying information. As discussed above, this information may be used by a registration authority and/or the system to verify the applicant's identity. The information may also be used to populate a form. One way this data may be used to verify the applicant's identity is to compare the information entered to a known agent of the health provider that the applicant purports to represent. In other words, the system can check a database to see if the person whose identification information has been entered is listed as associated with the health provider that was identified in the entry 405. The system may also verify that all of the other information entered on FIGS. 4 and 5 is accurate.

FIG. 6 is a figure representing a user interface 600 illustrating a knowledge based authentication user interface that may be used in accordance with an illustrative embodiment. In alternative embodiments, fewer, additional, and/or different elements may be present in the user interface.

The user interface 600 shows various questions that make up an example knowledge based authentication. Here, questions are posed to the applicant that those other than the applicant should not have knowledge of. Knowledge based authentication can be used as disclosed herein.

FIG. 7 is a figure representing a user interface 700 illustrating a registration authority scheduling user interface that may be used in accordance with an illustrative embodiment. In alternative embodiments, fewer, additional, and/or different elements may be present in the user interface. The user interface 700 shows a user interface that can be displayed after the identity verification and knowledge based authentication user interfaces (FIGS. 6 and 7) have been completed. Here, the applicant can choose an option 705 to meet with a registration authority now, or may choose an option 710 to schedule a later meeting with a registration authority.

Figure 8:
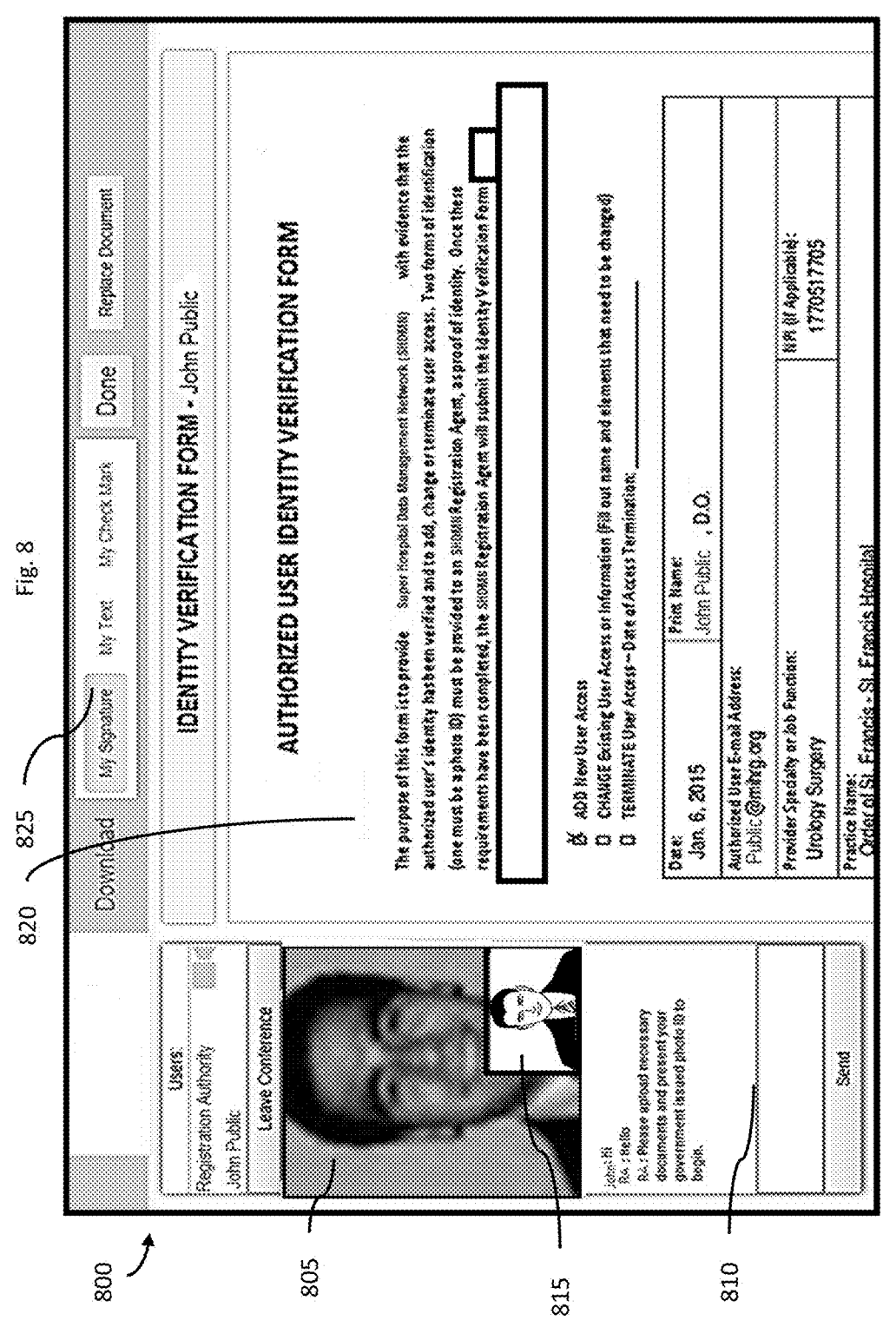

FIG. 8 is a figure representing a user interface 800 illustrating a real time interaction with a registration authority user interface that may be used in accordance with an illustrative embodiment. In alternative embodiments, fewer, additional, and/or different elements may be present in the user interface.

The user interface 800 shows a video feed 805 where the applicant can see the registration authority. The user interface 800 also includes a self-feed 815 where the applicant can see himself or herself. The user interface 800 also includes a chat 810 where the registration authority and the applicant can communicate through text. The user interface 800 therefore makes communication easy for both the applicant and the registration authority.

The user interface 800 also includes a view of the identity proving document 820. Both the applicant and the registration authority have a view of this document. Accordingly, the document can be digitally signed by the applicant in the presence of the registration authority. The menu 825 shows that text, digital signatures, and check marks may all be downloaded to be incorporated into the identity proving document 820. For example, the applicant could download and put in the document a digital signature and/or identification information used to fill out the form. The menu 825 also includes an option to complete the document and/or replace the document with another identity proving document.

Figure 9:
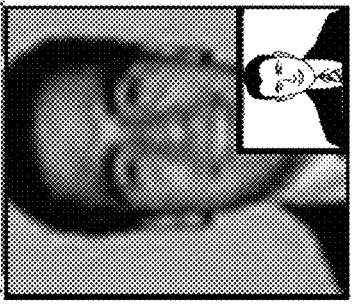
FIG. 9 is a figure representing a user interface further illustrating a real time interaction with a registration authority user interface that may be used in accordance with an illustrative embodiment.

FIG. 9 is a figure representing a user interface 900 further illustrating a real time interaction with a registration authority user interface that may be used in accordance with an illustrative embodiment. In alternative embodiments, fewer, additional, and/or different elements may be present in the user interface. The user interface is similar to the user interface shown in FIG. 8 and discussed above. For example, the user interface 900 shows the video and chat functions on the left side of the screen. Audio may also be transferred between the registration authority and the applicant along with the video. The user interface 900 also shows certain navigation buttons at the top, including download, my signature, my text, my check mark, and replace document. As disclosed herein, the download button may be used to download documents, forms of identification, proof of address, or other electronic files that are used or requested by the registration authority or part of the requirements to meet the applicable identity proofing standard.

Figure 10:
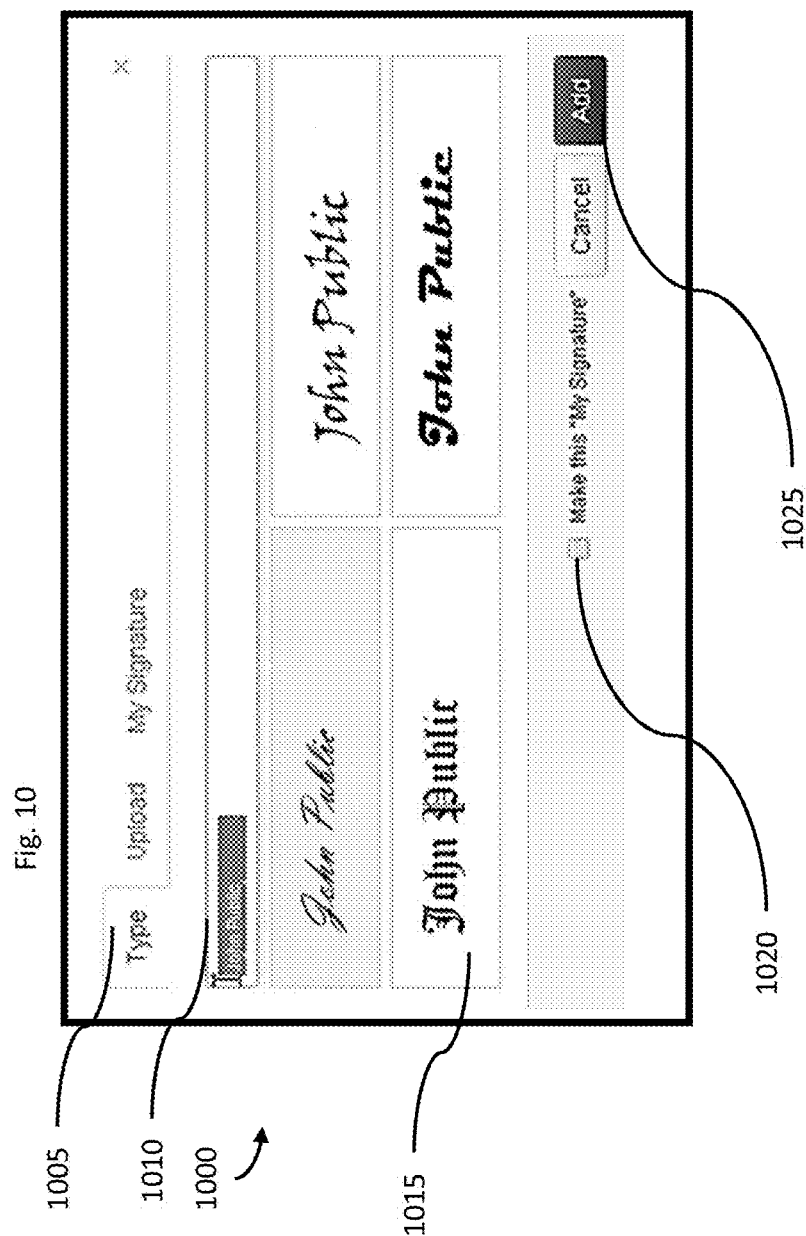
FIG. 10 is a figure representing a user interface illustrating a signature input user interface that may be used in accordance with an illustrative embodiment.

The "my signature," "my text," and "my signature" buttons may be selected to determine what is input into the document displayed on the screen. For example, in FIG. 9, the "my signature" button is selected. Accordingly, a cursor 910 shows where the applicant would add a signature if location where the cursor 910 currently is selected by the applicant. In FIG. 9, the cursor 910 is located in the applicant signature area of the form. This is where the applicant or applicant's signature is input. The signature area 920 shows where the identity registration authority signature is input. Table 905 shows where information on the form, also shown in FIG. 8 is input or populated regarding the individual requesting identity proofing. Verification area 915 allows the registration authority to certify that the applicant's identity has been verified, providing check boxes to designate types of identification checked, providing instruction and dating on how the identity was checked. Check boxes may be filled if the "my check mark" button at the top of the user interface 900 was selected. Pre-stored text may be input when my text is selected, or custom text may be entered. As is shown in FIG. 10 and discussed below, the various buttons at the top may have their respective signature, text, or check mark, edited. FIG. 10 shows how the signature may be edited in an illustrative example.

FIG. 10 is a figure representing a user interface 1000 illustrating a signature input user interface that may be used in accordance with an illustrative embodiment. In alternative embodiments, fewer, additional, and/or different elements may be present in the user interface. The user interface 1000 may be displayed on a computer as a new window from FIGS. 8 and 9 (that is, no part of FIGS. 8 and/or 9 would be shown while the user interface 1000 is displayed), or the user interface may be displayed as a pop-up or overlay over the displays shown in FIGS. 8 and 9. In such an instance, the portion of FIGS. 8 and/or 9 that are displayed may be displayed as shown in FIGS. 8 and/or 9, or may be displayed slightly differently, such as grayed out. In the grayed out embodiment, this emphasizes that the active part of the screen is the user interface 1000.

In the user interface 1000, the applicant may use the type tab 1005 to type their own custom signature into the text entry box 1010. Any text entered into the text entry box 1010 is then reproduced in different styles below, such as style 1015. The user interface 1000 also includes a check box 1020, which allows the applicant/signer//etc. to save a signature as my signature. In this way, the system can recall the signature for future use, so that the determined signature can be used at a later date without having to re-enter a signer's preferences. The signature can be added to the document by selecting the add button 1025.

The user interface 1000 may appear after the applicant selects a space on the form shown in FIG. 9 while the my signature button is selected. The user interface 1000 may also appear if the applicant otherwise designates that the signature dialog should be shown, such as a right click of a mouse and selection of a edit my signature menu choice. In addition to the type tab 1005, the user interface 1000 also includes the upload and my signature tabs. If the upload tab is selected, the applicant may be able to import into the interface and/or the system a signature stored on (or otherwise accessible to) the signer's electronic device. If the my signature tab is selected, the applicant may view or edit a previously saved signature.

Figure 11:
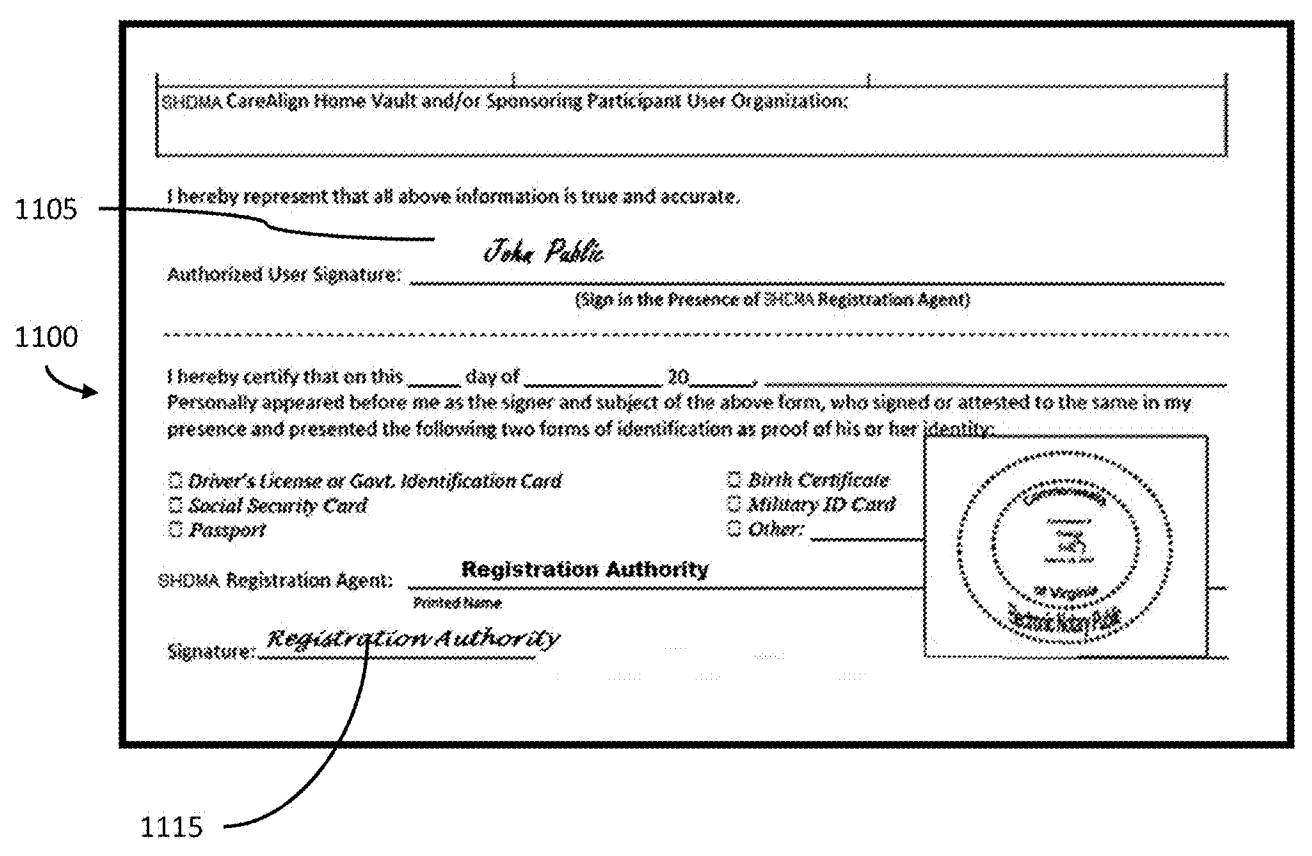

FIG. 11 is a figure representing a user interface 1100 illustrating a registration authority electronic signature certificate on a verification form user interface that may be used in accordance with an illustrative embodiment. In alternative embodiments, fewer, additional, and/or different elements may be present in the user interface. The user interface 1100 demonstrates a digitally signed identity proofing verification form. An applicant signature 1105 has been entered. A signature 1115 has been entered.

In an illustrative embodiment, a form is digitally signed by the registration authority as a witness either in session or outside of the session. In other words, the registration authority may or may not sign the form in the user interfaces shown in FIGS. 8 and 9. For example, a product such as Adobe Acrobat™ may be used to input the signature or digitally sign the form. In various embodiments such as this one, the registration authority may also input a digital certificate into the form.

Where the digital certification, and/or signature is entered into the form not using the system user interfaces shown in FIGS. 8 and 9, the form may be downloaded from the system server and onto a computer operated by the registration authority. In this way, the registration authority can adequately apply their signature to the document while it is locally stored on their computer. Once that is complete, the document can then be uploaded back onto the system server, so that the information can be sent out and the trusted identity or other account type are issued or provisioned to the applicant.

Figure 12B:
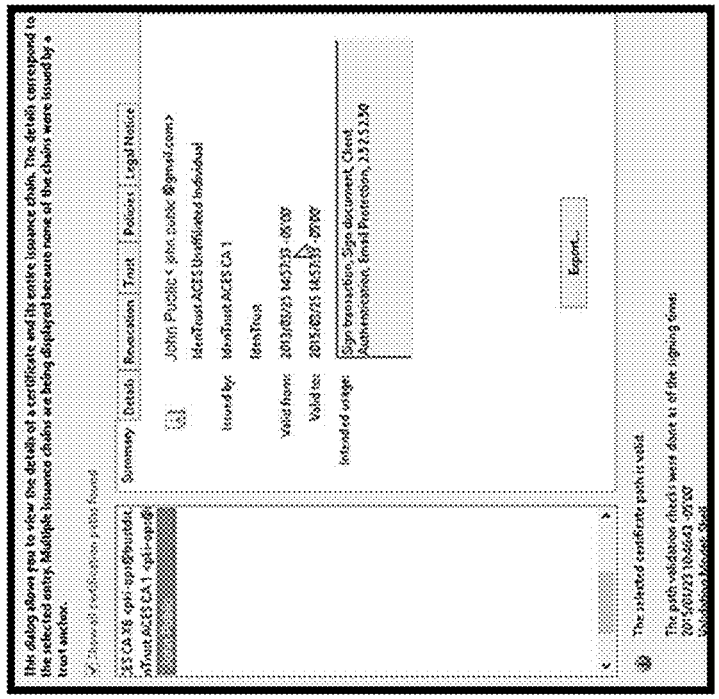
FIG. 12B is a figure representing a user interface illustrating a signature certificate dialog properties user interface that may be used in accordance with an illustrative embodiment.
Figure 12A:
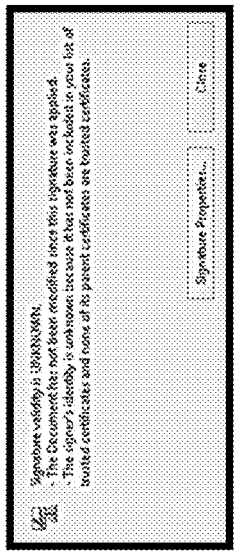
FIG. 12A is a figure representing a user interface illustrating a signature certificate dialog user interface that may be used in accordance with an illustrative embodiment.

FIG. 12A is a figure representing a user interface 1200 illustrating a signature certificate dialog user interface that may be used in accordance with an illustrative embodiment. In alternative embodiments, fewer, additional, and/or different elements may be present in the user interface. User interface 1200 demonstrates how a digital certificate, may be selected to view information regarding the digital certificate. The user interface 1200 also includes a signature properties button, which, if selected, allows the applicant to see more detailed properties of the digital certificate. An example of such detailed properties is shown in FIG. 12B.

FIG. 12B is a figure representing a user interface 1250 illustrating a signature certificate dialog properties user interface that may be used in accordance with an illustrative embodiment. In alternative embodiments, fewer, additional, and/or different elements may be present in the user interface. The user interface 1250 shows various properties of an example digital certificate included in the seal 1110 shown in FIG. 11. Such information helps verify that a certificate and its path is valid, and that the document has not been tampered with. Such information may be checked before granting access rights, such as an Health Information Services Provider (HISP) account like a Direct Trust account (including an e-mail account), single sign on, federated identity, and the like as disclosed herein. Such access rights can grant the applicant access to protected information such as health records.

Certain of the devices shown in FIG. 1 include a computing system. The computing system includes a processor (CPU) and a system bus that couples various system components including a system memory such as read only memory (ROM) and random access memory (RAM), to the processor. The aspects disclosed herein may be suitably implemented on conventional computing devices, for example, computer workstations, on Internet based applications, on optical computing devices, neural computers, biological computers, molecular computing devices, and other devices. As may be appreciated by those skilled in the art, the aspects disclosed herein may be implemented on any system, automaton, and/or automated machine.

FIG. 13 is a figure representing a user interface 1300 illustrating a remote identity proofing user interface that may be used in accordance with an illustrative embodiment. In alternative embodiments, fewer, additional, and/or different elements may be present in the user interface. The user interface 1300 represents a starting screen for a remote identity proofing service. The remote identity proofing service may be used by an applicant to get a trusted identity, which may allow the applicant to use secure single sign-on to multiple services, systems, applications, or platforms.

The user interface includes a get started button 1305, a see quick demo button 1310, and a prices button 1315. If the applicant interacts with the button 1305 through a mouse click, touch screen, voice command, etc. then the remote identity proofing will proceed to get information from the applicant with the aim of issuing a trusted identity. Interacting with the button 1305 can constitute a request to verify an identity from an applicant device. Interacting with the button 1305 may direct the applicant to a user interface such as the one shown in FIG. 14.

If the applicant interacts with the button 1310, the applicant may directed to an interface that demonstrates how the remote identity proofing service works and what the various interfaces look like. Accordingly, a demonstration incorporating any of the systems and methods disclosed herein may be shown. If the applicant interacts with the button 1315, the applicant is directed to a user interface that displays prices for remote identity proofing. The price list may include prices for different types of services, different health systems or geographic areas, various discounts such as promotional or group discounts, etc.

FIG. 14 is a figure representing a user interface 1400 illustrating a terms and conditions user interface that may be used in accordance with an illustrative embodiment. In alternative embodiments, fewer, additional, and/or different elements may be present in the user interface. The user interface 1400 includes a scroll bar 1405 and terms and conditions 1410. The applicant can scroll through the terms and conditions 1410 using the scroll bar 1405.

After reading the terms and conditions 1410, the user can check a box indicating that they agree with the terms and conditions 1410. In one illustrative embodiment, the applicant may not be able to check a box indicating they agree to the terms and conditions 1410 until the applicant has scrolled through the entire terms and conditions 1410. After agreeing to the terms and conditions 1410, the system may save a copy of the agreement. Further, the system may insert a timestamp on the agreement to indicate a time and/or date of when the applicant agreed to the terms and conditions 1410. The system may also include the copy of the agreement with a form to be filled out in subsequent user interfaces. After agreeing to the terms and conditions, the system navigates to another user interface, such as the user interface shown in FIG. 15.

Figure 15:
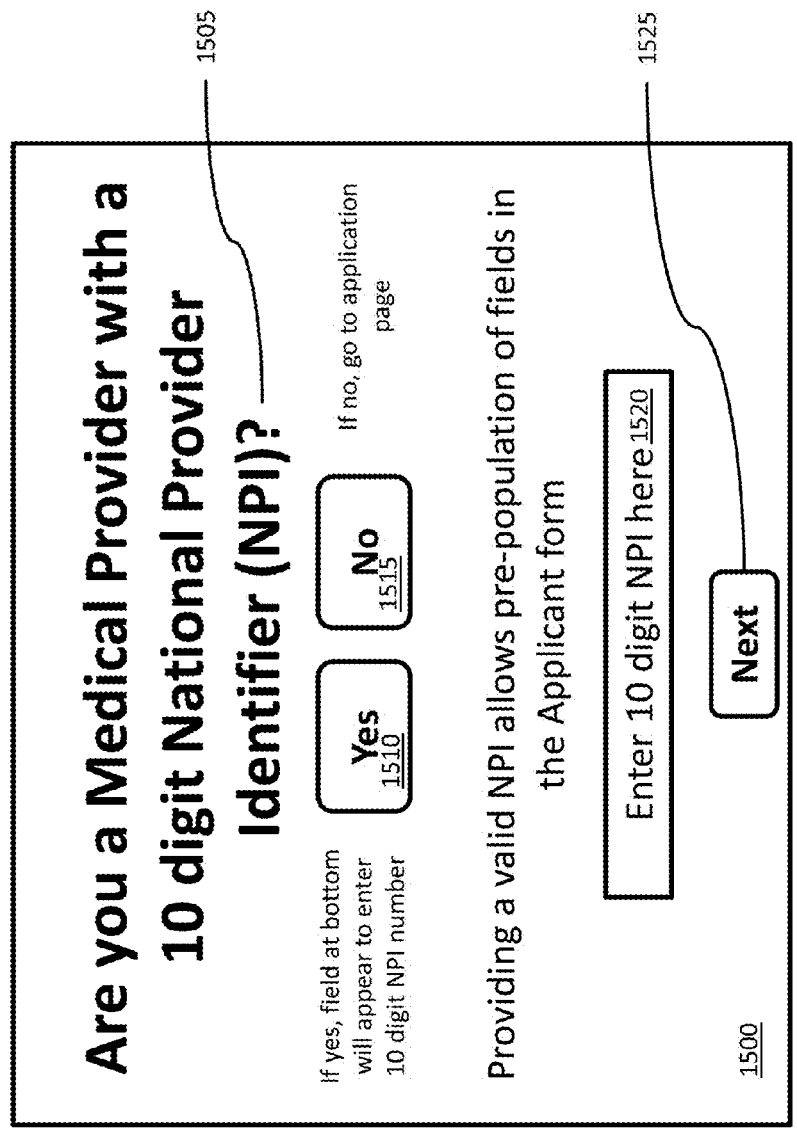
FIG. 15 is a figure representing a user interface illustrating a national provider identifier (NPI) entry user interface that may be used in accordance with an illustrative embodiment.

FIG. 15 is a figure representing a user interface 1500 illustrating a national provider identifier (NPI) entry user interface that may be used in accordance with an illustrative embodiment. In alternative embodiments, fewer, additional, and/or different elements may be present in the user interface. The user interface 1500 shows a popup window. Other user interfaces disclosed herein may also be popups in alternative embodiments. A popup window is a display that overlays another display or user interface. That is, when the user interface 1500 is shown, it is shown overlaid across another user interface, such as the user interface 1400. When one user interface is shown overlaying the other, both user interfaces are displayed, but one of the user interface is obscured by the other. In another embodiment, the user interface 1500 may be showed overlaying the user interface 1600 as shown in FIG. 16. In that embodiment, a portion of the user interface 1600 that is visible may be grayed out. In another embodiment, user interface 1500 may not be a pop up and may be its own independent user interface.

The user interface 1500 requests a national provider identifier (NPI) from an applicant if an NPI is available. First, the system requests the NPI at a questions 1505. If the applicant has an NPI, the applicant may interact with the yes button 1510. If the applicant does not have an NPI, the applicant may interact with the no button 1515. If the applicant interacts with the no button 1515, the applicant is directed toward a page such as the user interface shown in FIG. 16. If the applicant interacts with the yes button 1515, the applicant may then enter their NPI into the dialog box 1520. In one embodiment, the dialog box 1520 may not be present until the applicant interacts with the yes button 1510. Once the applicant has entered the NPI into the dialog 1520, the applicant may interact with a next button 1525 to advance to a next user interface, such as the one shown in FIG. 16.

If an NPI is entered, the system may look up that provider in a health provider directory (HPD). The HPD may provide more information on the applicant. The additional information can be used to populate fields of various forms, including the one displayed in FIG. 16. The information from the HPD about the provider/applicant may be provided via a query to the HPD. The query may be through a rest/restful API to the HPD. The HPD may be maintained and stored by the system, or may be outside and independent of the systems disclosed herein.

FIG. 16 is a figure representing a user interface 1600 illustrating an identity information entry user interface that may be used in accordance with an illustrative embodiment. In alternative embodiments, fewer, additional, and/or different elements may be present in the user interface. The user interface 1600 includes a table where demographic information may be entered about the applicant. Some of the demographic information may be considered knowledge based authentication. Any information entered into the table may be checked against various databases to determine its accuracy. For example, the system may check entered information against current health records for a match to ensure that the information entered is accurate and increase security. Information other than the information types in the table may also be requested (either here as applicant information or subsequently for knowledge based authentication). Other information than that of FIG. 16 that may be used includes, mother's maiden name, time of birth, sex/gender, patient alias, race, country, home or other phone number, work phone number, primary language, marital status, religion, patient account number, social security number, driver's license number, ethnic group, birth place, birth order, citizenship, veterans military status, or nationality.

As disclosed above, some or all of the fields in the table in the user interface 1600 may be populated automatically based on the HPD query results. The user interface 1600 also includes a dialog 1605 that allows a user to input a discount code for remote identity proofing and issuing trusted identity services. Different types of discount codes may be accepted and applied as a credit toward services rendered. Different discount codes may trigger different features, workflows, and/or billing/payment processing. Some discount codes may effectively comprise pre-paid credits for any remote identity proofing services.

FIG. 17 is a figure representing a user interface 1700 illustrating a an identity information verification user interface that may be used in accordance with an illustrative embodiment. In alternative embodiments, fewer, additional, and/or different elements may be present in the user interface. The user interface 1700 shows an interface similar to the user interface in FIG. 16, except that information has been actually been entered. Choices of a go back button 1705 or confirm button 1710 are displayed to the applicant. The applicant may accept his or her entries by selecting the confirm button 1710. The applicant may go back to the user interface 1600 by selecting the go back button 1705. The user interface 1700 may be printed, saved, or otherwise retained by the system. In one embodiment, the information may be saved as a form. In that embodiment, the information may be saved as shown in the user interface 1700, or the information in the table may be used to populate a pre-made form. In either case, a retained form may be retained for records to be compliant with an identity proofing standard. For example, the system may retain forms as required by DirectTrust.

FIG. 18 is a figure representing a user interface 1800 illustrating a knowledge based authentication user interface that may be used in accordance with an illustrative embodiment. In alternative embodiments, fewer, additional, and/or different elements may be present in the user interface. The user interface 1800 shows how knowledge based authentication (KBA) might be utilized to verify an identity. Questions are displayed on the left and an applicant is to enter answers on the right. The questions in the KBA may be related to information about the Applicant stored in credit bureaus and/or related databases. Other databases may be utilized in various embodiments such as government databases, online sources, etc. By demonstrating correct knowledge about the Applicant by her/himself, the individual becomes. After completing the KBA, the user may select the next step button 1805.

FIG. 19 is a figure representing a user interface 1900 illustrating an information upload user interface that may be used in accordance with an illustrative embodiment. In alternative embodiments, fewer, additional, and/or different elements may be present in the user interface. The user interface 1900 provides an opportunity to the applicant to upload identification for verification by a registration authority.

For example, the user may upload a first and second form of identification. The first form of identification may be a government identification with picture. A second form may be a recent financial statement or utility bill with a current address. When uploading an identification, the applicant may select the specific type from among types 1915 and 1930. The applicant may then use the select buttons 1905 and 1920 to confirm the types selected in 1915 and 1930. Furthermore, the browse to file buttons 1910 and 1925 can be selected to find a document store on an applicant device. In other embodiments, the forms of identification may be different based on the identity proofing requirements for the type of trusted identity requested by the applicant.

In an alternative embodiment to FIG. 19, an applicant may not upload identification documents to the remote identity proofing system. Instead, the applicant may present identification documents to the registration authority through the live video feeds displayed to the registration authority (such as the one shown in FIG. 22. If the identification is not uploaded, FIG. 19 may not be displayed as an interface. In an alternative embodiment, a substitute interface may be used. For example, a substitute interface may inform the applicant as to what types of identification the applicant should present to the registration authority once the session starts. In another alternative embodiment, FIG. 19 may be displayed largely as shown, but may include an option for the applicant to select an option that indicates the applicant will present the identification during the session rather than upload it. Presenting the identification may include holding up a form of identification to a camera being used for a live video feed of the real time communication session.

Figure 20:
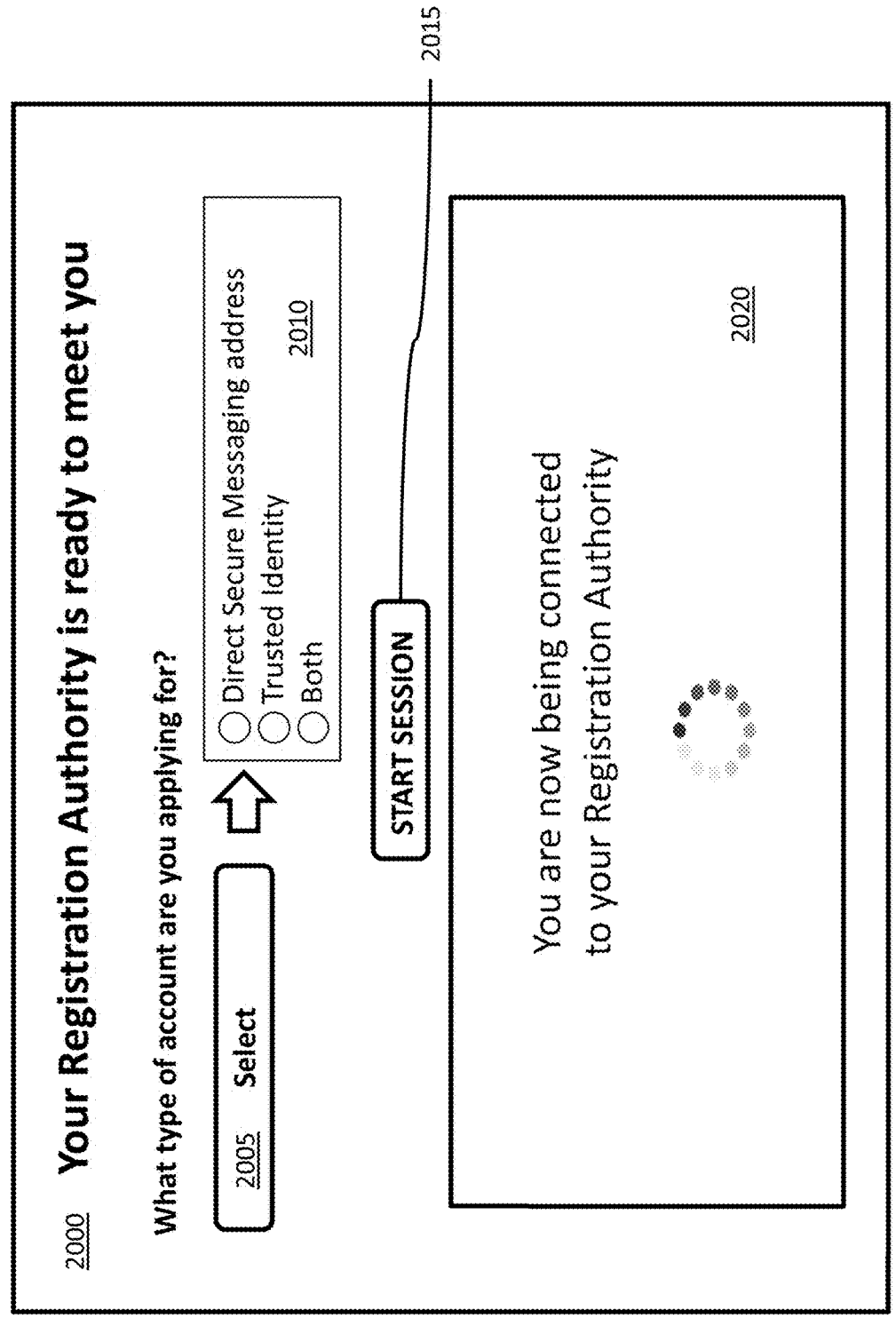
FIG. 20 is a figure representing a user interface illustrating a registration authority pre-meeting user interface that may be used in accordance with an illustrative embodiment.

FIG. 20 is a figure representing a user interface 2000 illustrating a registration authority pre-meeting user interface that may be used in accordance with an illustrative embodiment. In alternative embodiments, fewer, additional, and/or different elements may be present in the user interface. After the steps of uploading identification information, a real time commissions being with you than it is here for me. The applicant may select whether the applicant would like a Direct Source Messaging address, a trusted identity, or both. The applicant may press the select button 2005 to confirm the selection 2010. In alternative embodiments, the selection 2010 may have varying choices for types of trusted identities, certifications, single sign-ons, messaging services, etc. requested by the Applicant.

After choosing the selection 2010, the applicant may select a start session button 2015. This will initialize a real time communication session with a registration authority as shown in dialog 2020. Depending on what the applicant selects at the selection 2010, it will determine what credentials are issued later in the process (see, e.g., FIGS. 25 and 26 and accompanying description below). In other words, if an applicant only asks for a trusted identity, the applicant will only receive one trusted identity upon completion of the remote identity proofing.

In alternative embodiments to FIG. 20, the selection 2010 may be different. For example, other credentials or features may be selected. For example, the interface may allow a choice to collect biometric information after the applicant's identity has been verified. In other embodiments, the forms of identification may be different based on the identity proofing requirements for the type of trusted identity requested by the applicant. In another embodiment, additional choices for credentials may be present. Additional indications of how an applicant intends to utilize biometric information or credentials may be present, which can help determine whether to issue certain types of credentials to the applicant. In another embodiment, the applicant may not be displayed with a choice to select types of credentials. In such an embodiment, the system may default to issuing a certain credential(s) and perform the identity proofing accordingly. In another alternative embodiment, the system may determine which credentials should be issued based on the identity of the provider/applicant, the applicant's log in information, a URI used to access the remote identity proofing system, etc. In other words, the system may automatically infer which credentials to issue based on other information received by the system. For example, if a doctor logs on who is a part of St. Michael's hospital, the system may identify that the doctor is from St. Michael's based on the doctor's log in information, explicit input from the doctor, information looked up on a database using the doctor's NPI, information implied from a particular URI used by the doctor (the system may recognize particular links as being associated with particular info, such as St. Michael's hospital). In the embodiment where a URI is used to determine particular information, different URIs may be issued to or used by different entities. The system may recognize the URI as attempting to navigate to remote identity proofing services and navigate them there, but the URIs are different such that the system can infer information from them (such as the example here where a particular URI is associated with a particular hospital and type of credentials to issue).

Figure 21:
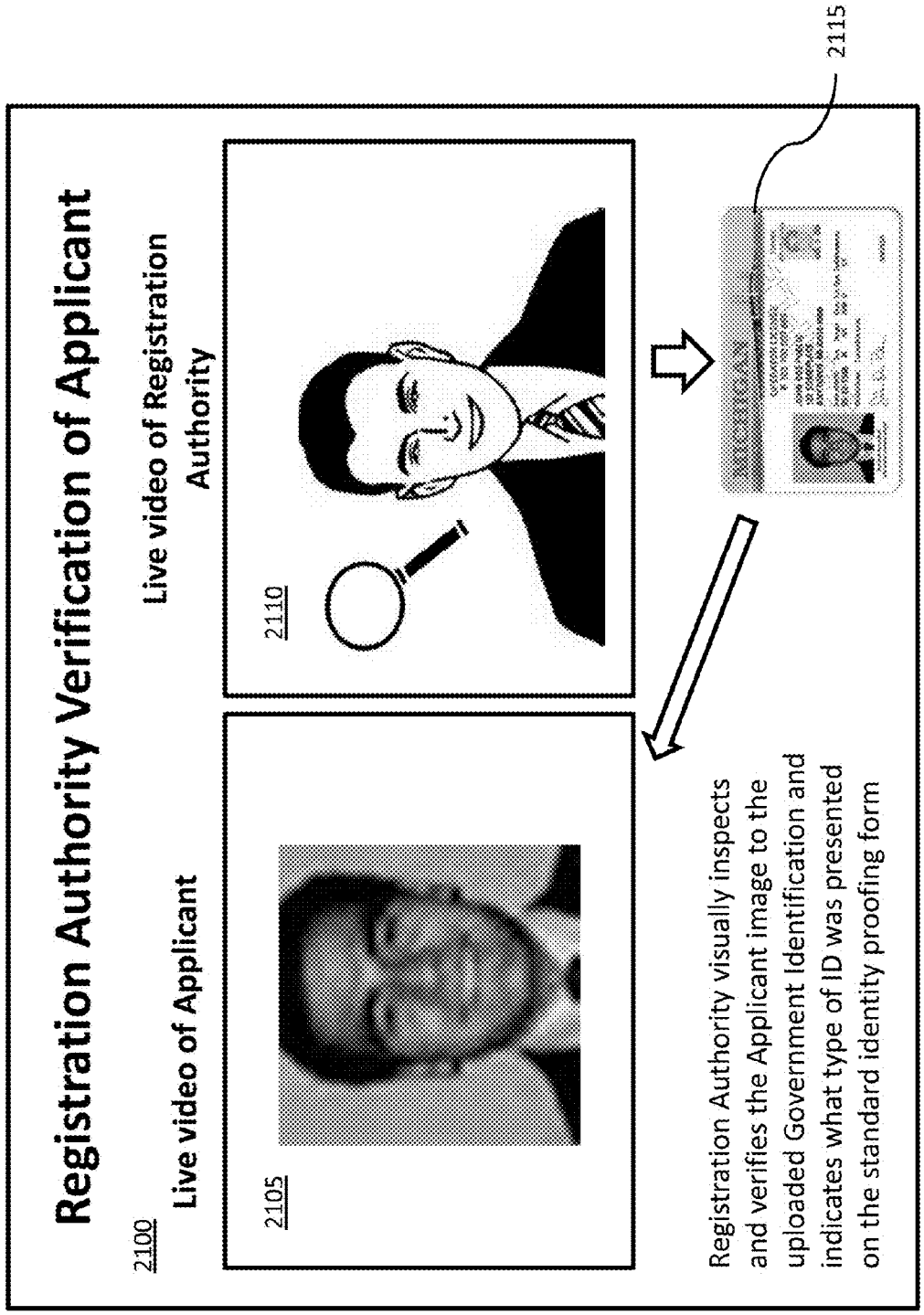
FIG. 21 is a figure representing a user interface illustrating a registration authority real time communication user interface that may be used in accordance with an illustrative embodiment.

FIG. 21 is a figure representing a user interface 2100 illustrating a registration authority real time communication user interface that may be used in accordance with an illustrative embodiment. In alternative embodiments, fewer, additional, and/or different elements may be present in the user interface. The user interface 2100 demonstrates a real time communication session where an Applicant is communicating with a registration authority in real time via a video chat. A live video feed of the applicant is shown at screen 2105, while a live video feed of the registration authority is shown at screen 2110.

During the real time communication session, the registration authority may examine (including performing an in-person identity proofing) identification of the applicant, including forms of identification that were previously uploaded. In this example, the registration authority is examining the applicants driver's license 2115. For identification types using a picture identification, the registration authority inspects that the applicant live video feed matches the picture from the picture identification. After doing so, the registration authority would then indicate the identification checked on a form, here a standard form. In an alternative embodiment, the identification may be viewed and verified through the live video feed.

FIG. 22 is a figure representing a user interface 2200 illustrating a registration authority uploaded items review user interface that may be used in accordance with an illustrative embodiment. In alternative embodiments, fewer, additional, and/or different elements may be present in the user interface. The user interface 2200 shows various uploaded government issued photo identifications that the registration authority can check to in-person verify that the applicant is who he/she says he/she is. The identification panel 2205 includes in this embodiment a US Passport 2215 and a government issued identification 2210. Here, a registration authority will initiate a process to verify the uploaded or presented government identifications utilizing applicable agencies, institutions, or related databases. The user interface 2300 discussed below displays a result of the verification process initiated by the registration authority. In an alternative embodiment, the user interface 2200 may not display the government identification. For example, as described above with respect to FIG. 19, an applicant may not necessarily upload identification documents. An applicant may instead present the documents through live video during a real time communication session. Accordingly, in such an embodiment, the user interface 2200 may not be displayed by the system.

FIG. 23 is a figure representing a user interface 2300 illustrating a identity confirmation user interface that may be used in accordance with an illustrative embodiment. In alternative embodiments, fewer, additional, and/or different elements may be present in the user interface. The user interface 2300 demonstrates that an applicant's identity has been successfully verified.

A verification summary 2305 and verification detail 2310 is shown in the user interface 2300. The verification summary 2305 and verification detail 2310 shows that the applicant in this case has a verified image, government identification, and financial information. The verification detail 2310 confirms that these verifications have been successful by displaying checkmarks. If there were verifications that were not successful, a check mark would not appear. In another embodiment, a different icon might appear, such as an "X." Once the applicant has finished viewing the user interface 2300, the user can proceed by interacting with the next button 2320.

FIG. 24 is a figure representing a user interface 2400 illustrating a signed form user interface that may be used in accordance with an illustrative embodiment. In alternative embodiments, fewer, additional, and/or different elements may be present in the user interface. The user interface 2400 shows an example of a signed and completed form. The form includes information such as the information entered and confirmed as discussed with respect to FIGS. 16 and 17. In this example, a form with the identity proofing requirements compliant with NIST LOA 3 is displayed. Other types of forms may be utilized in other embodiments as disclosed herein.

The signed and completed form also includes an applicant signature 2405 and an alternative embodiment including a digital and visual notary seal 2410 if applicable. The applicant signature 2405 is applied digitally by the applicant during the real time communication session. As disclosed herein, the registration authority may be able to witness the applicant sign the form during the real time communication session. This may comply with various identity proofing standards, such as NIST LOA 3. In the alternative embodiment, the registration authority may notarize the form, the applicant may sign the form during the real time communication session before the seal 2410 is applied. In the alternative embodiment, the registration authority may be a notary public, authorized to notarize signed documents. For example, a notary public may be an official notary public of the Commonwealth of Virginia, United States, which permits electronic notary verification. A notarization and subsequent notary seal 2410 as shown in FIG. 24 may be applied to the form if applicable because of identity proofing requirements. The system can record the identification type verified by the registration authority on the form, as well as the time stamp of the terms and conditions agreement. After the form is completed and digitally signed, automated workflow APIs are triggered to send any completed forms, a digital token, and metadata to a issuing trusted identity service. The completed digitally signed form is also sent to the applicant or downloaded by the applicant.

FIG. 25 is a figure representing a user interface 2500 illustrating a login portal user interface that may be used in accordance with an illustrative embodiment. In alternative embodiments, fewer, additional, and/or different elements may be present in the user interface. The applicant interface 2500 provides the applicant with a Direct Secure Messaging address. As indicated, the applicant also should have received a password in the applicant's e-mail account. In an alternative embodiment, the system may collect biometric information and associate the biometric information with the Direct Secure Messaging account. In such an embodiment, the user interface 2500 may include elements similar to those shown in FIG. 26 that help the applicant navigate to biometric capture functionalities.

FIG. 26 is a figure representing a user interface 2600 illustrating an initial biometric capture user interface that may be used in accordance with an illustrative embodiment. In alternative embodiments, fewer, additional, and/or different elements may be present in the user interface. The user interface 2600 includes a trusted identity login and indicates that the password for the account should be sent to the applicant's e-mail.

The user interface 2600 also introduces the topic of biometric capture to supplement and/or accompany an applicant's trusted identity. If the applicant selects start biometric capture 2605, the device will attempt to initialize a biometric capture with hardware attached to or in communication with the device. This may work well if the applicant is at a biometric capture equipped device or kiosk or has possession of hardware that captures biometric data. If the applicant selects the find nearest kiosk button 2610, the system may locate a kiosk or kiosks within relatively close proximity that are capable of capturing biometric information. Additionally, the applicant may be able to schedule a biometric capture 2615 at a mobile or remote location that has biometric capture hardware/software. A mobile location may be brought to the applicant and the applicant may schedule an appointment for such an occasion. In other words, a biometric capture could happen anywhere, and could happen separate in time and place from the identity proofing. If the applicant selects the button 2605, the system may navigate the applicant to a user interface as shown in FIG. 27.

Sending the trusted identity and/or Direct Secure Messaging account information to the applicant may be done in different ways. For example, one of the user name or password may be sent out of band (that is, through a different medium). For example, a user name may be displayed by the system to the applicant after identity proofing is complete. The password may be sent out of band to the applicant. The password may be sent through e-mail, a text message, a chat message, the Direct Secure Messaging account, fax, voice call, or any other medium of exchanging information such that the applicant has access to it. In another illustrative embodiment, the system may not display a user name to the applicant, all of the access credentials are issued to the applicant through mediums other than the remote identity proofing system.

In an illustrative embodiment, the user interface 2500 in FIG. 25 and the user interface 2600 in FIG. 26 are shown in sequence. In this embodiment, the order may be switched. Also in this embodiment, the system will have issued a trusted identity and Direct Secure Messaging account. In another embodiment, the trusted identity and Direct Secure Messaging account information may be displayed on a single user interface. That is, elements of the user interface 2500 and the user interface 2600 may be shown together in a single user interface. In another illustrative embodiment, the system may not issue both a trusted identity and a Direct Secure Messaging account. In such an embodiment, only the interface relating to the actually issued credentials would be shown. In an illustrative embodiment, determinations about which interface is shown and which credentials are issued may be based on user input at the user interface 2000 in FIG. 20. In other words, if an applicant only selects to receive a trusted identity, then only the user interface 2600 (and not 2500) is displayed to the applicant in issuing the trusted identity.

In another illustrative embodiment, the user interface 2500 may be displayed first giving the applicant their Direct messaging services information. Instead of displaying the user interface 2600 to provide the trusted identity information, the system may instead display a user interface (or include on the user interface 2500 instructions) that instructs the user to log in to their new Direct account in order to receive their trusted identity. Other information than trusted identity information may also be sent to the applicant's Direct messaging account. For example, the completed identity form, biometric information, or other issued credentials may also be sent to the applicant's Direct messaging account.

FIG. 27 is a figure representing a user interface 2700 illustrating a biometric capture instruction user interface that may be used in accordance with an illustrative embodiment. In alternative embodiments, fewer, additional, and/or different elements may be present in the user interface. The user interface 2700 shows instructions for capturing biometric information, specifically related to capturing a palm scan. Instructions 2710 and 2715 demonstrate to a user how to use a palm scanner. The image 2705 shows a sample palm scan. The user can start the biometric capture with the button 2720. In other embodiments, different or additional biometrics may be captured as disclosed herein.

Biometrics may be utilized along with a trusted identity in various ways. For example, a palm scan is associated with the trusted identity such that an applicant may use the palm scan as a single sign-on into a system that supports palm scan reading. In another embodiment, biometric information may be utilized to issue or re-issue a trusted identity or direct trust messaging account. In an embodiment where a new trusted identity or Direct Secure Messaging account is requested issued, a database may already have that applicant's biometric data stored. In other words, the system may be able to match an applicant to his or her biometric data just as the system would match an applicant to any other data such as an address. In an embodiment where biometric data is used to re-issue a trusted identity or Direct Secure Messaging account, the biometric data may be stored in a database prior to a first issue of a trusted identity as in the previous example, or the biometric data may have been acquired as part of a previous identity proofing process.

Figure 28:
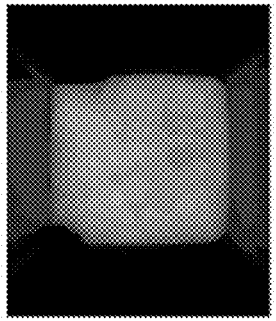
FIG. 28 is a figure representing a user interface illustrating a registration summary user interface that may be used in accordance with an illustrative embodiment.

FIG. 28 is a figure representing a user interface 2800 illustrating a registration summary user interface that may be used in accordance with an illustrative embodiment. In alternative embodiments, fewer, additional, and/or different elements may be present in the user interface. The user interface 2800 shows a registration and identity proofing summary 2805. The summary 2805 includes some of the information acquired during the identity proofing process. Here, the summary 2805 includes a photo, a palm scan, and basic demographic information about the applicant. If the applicant agrees that the all the information in the summary 2805 is correct, the applicant may accept and confirm all information is correct by selecting a button 2810. If the applicant chooses not to proceed and/or the information is not correct the applicant can select a cancel button 2815. If the applicant selects cancel, the system may direct the user to previous user interfaces discussed above so that the applicant may correct and/or reenter different information. The applicant may also select which information they would like to reenter, and therefore determine which interfaces they are routed to.

Various physical systems such as a computing system may be used as described herein to perform various methods described herein may use various memory elements. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, motion detection, camera for video and photo input, and so forth. An output device can include one or more of a number of output mechanisms, such as a display screen, a printer, or speaker. In some instances, multimodal systems enable a applicant to provide multiple types of input to communicate with the computing system. A communications interface generally enables the computing device system to communicate with one or more other computing devices using various communication and network protocols.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a user interface. Such user interface's may include interactive features such as pop-up or pull-down menus or lists, selection tabs, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Automated Identity Proofing with Escalation Strategy

The systems and methods disclosed herein can also be adapted for different purposes, levels of assurance, and can be implemented in a fully automated or partly automated process. Additionally, the various methods disclosed herein can also utilize an escalation strategy to increase accuracy and decrease fraud during identity proofing processes.

Figure 29:
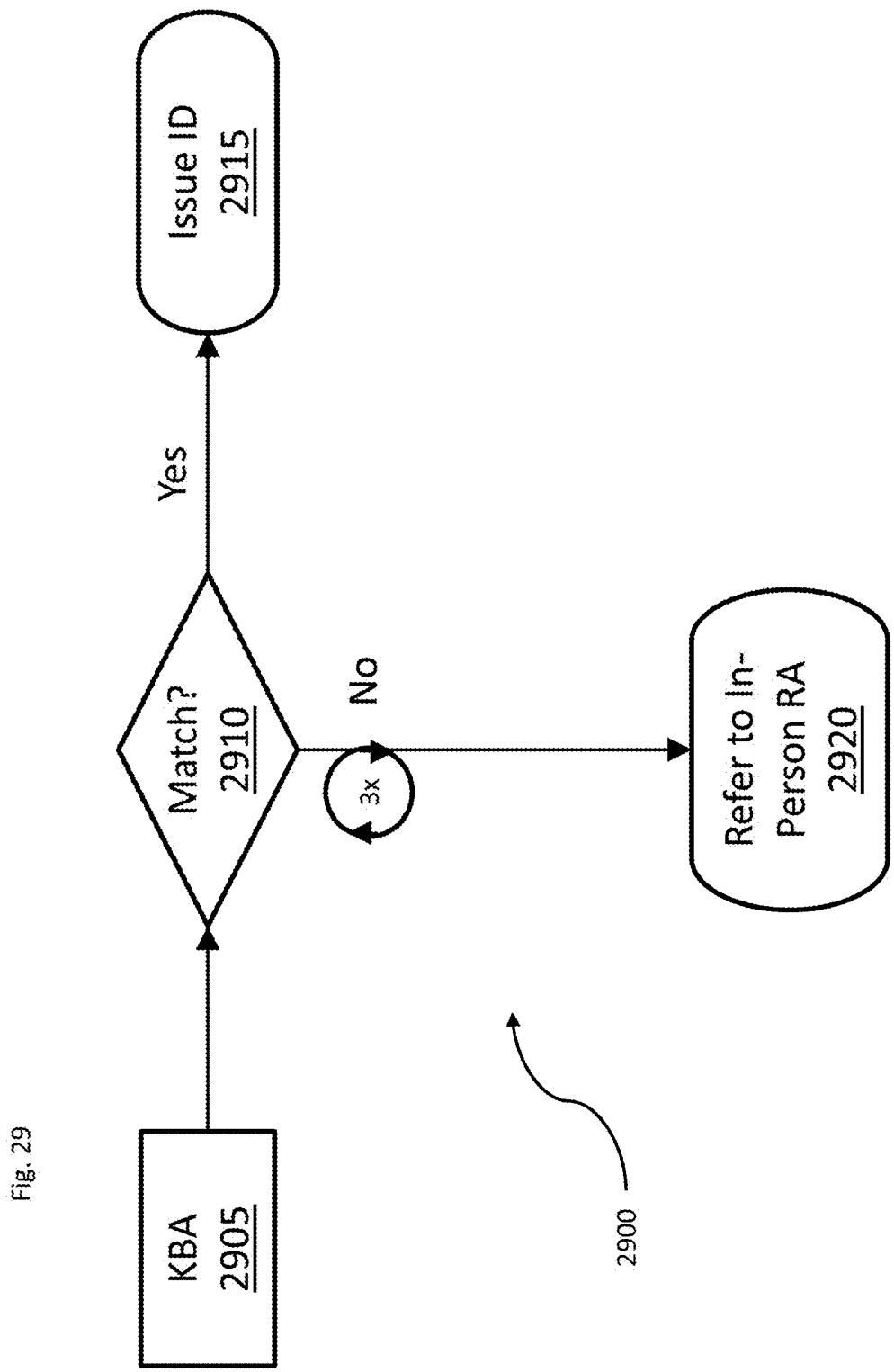
FIG. 29 is a flow diagram illustrating a process for automated identity proofing with an escalation strategy in accordance with an illustrative embodiment.

FIG. 29 is a flow diagram illustrating a process 2900 for automated identity proofing with an escalation strategy in accordance with an illustrative embodiment. The system receives a request to verify an identity from an applicant device as disclosed herein. Such a request includes a request for trusted identity information and authentication information associated with the identity as disclosed herein. The authentication information is information that relates to the applicant so that the applicant's identity can be verified. The system compares the authentication information to stored identity information according to one or more identity proofing requirements. The stored identity information is information related to individuals that can be used to compare to the authentication information to verify an identity. For example, in an operation 2905, a knowledge based authentication (KBA) can be applied, where the applicant provides answers to questions about their personal, financial, or other information, which can then be compared with stored information to determine if the answers provided are correct in an operation 2910. As one example, the stored information can be stored in a database such as a master person index or other storage for information. Here, the failed match is determined if incorrect authentication information is received from the applicant device more than a predetermined number of attempts. In FIG. 29, the number of failed attempts is three (3) times. However, in other embodiments one, two, four, or any other number of failed attempts may cause the failed match to be determined. Determining the failed match with KBA may include, for example, sending a request for KBA information to the applicant device and subsequently receiving at least one reply that includes information that fails to satisfy the request for the KBA information.

In an operation 2920, the system refers the applicant (or provides a referral) to an in-person registration authority if a failed match is determined between the authentication information and the stored identity information. A failed match is determined when authentication information or identification provided by an applicant does not match the stored identity information stored in a database, such as a master person index. An in-person registration authority is a person who can manually check identification provided by an applicant to issue a trusted identity.

In an operation 2915, the system can issue a trusted identity as disclosed herein. For example, the system may send a token to an issuing trusted identity service. In response, the issuing trusted identity service may send the trusted identity information to the applicant device in response to the token. In other embodiments, the system may also incorporate the issuing trusted identity service as a part of the same system that verifies identities.

Figure 30:
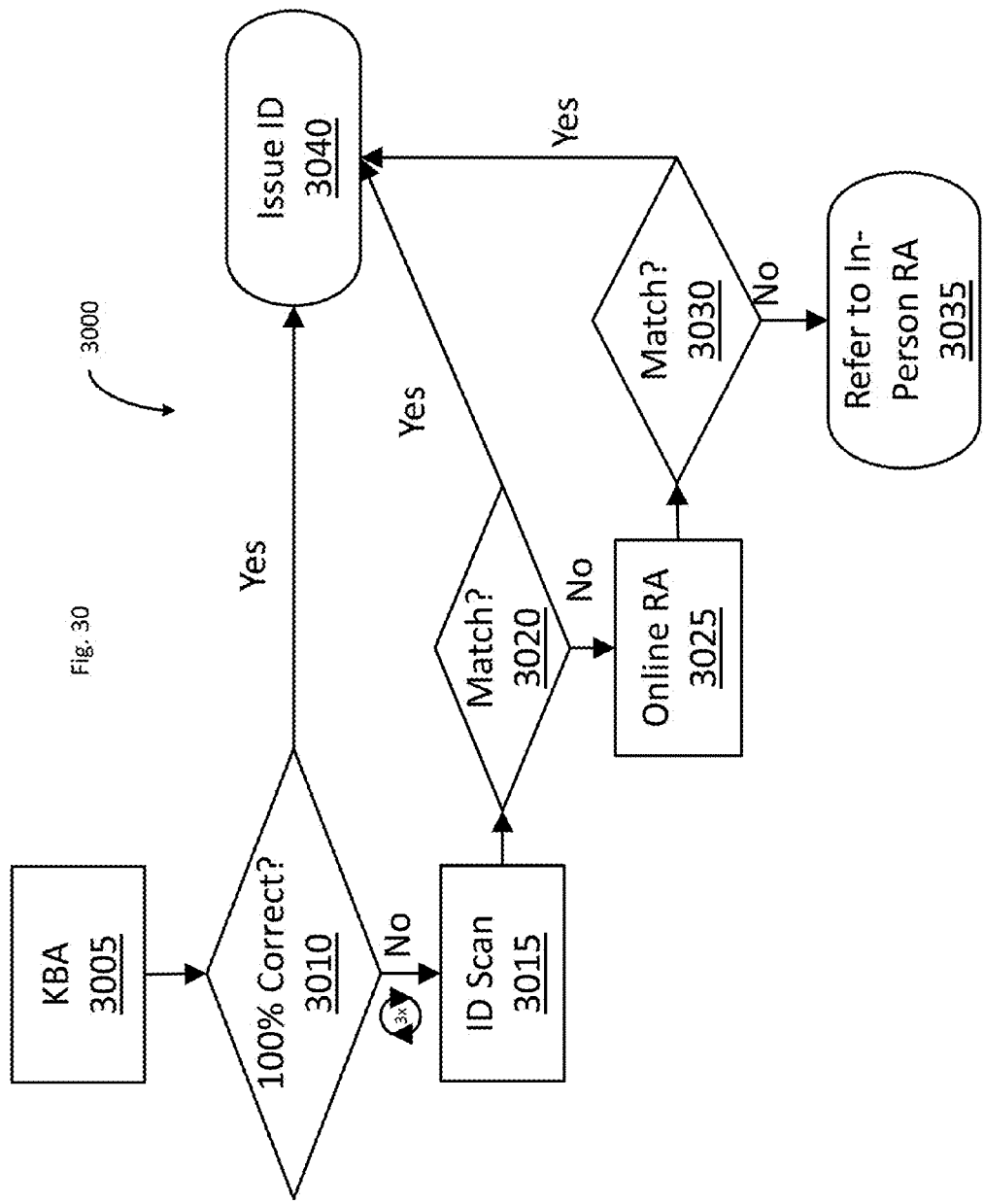
FIG. 30 is a flow diagram illustrating a process for automated identity proofing incorporating an online registration authority in accordance with an illustrative embodiment.

FIG. 30 is a flow diagram illustrating a process 3000 for automated identity proofing incorporating an online registration authority in accordance with an illustrative embodiment. In an operation 3005, the KBA is presented to determine a match between authentication information and stored identity information in an operation 3010 as disclosed herein. In an operation 3040, the system can issue the trusted identity if a match is determined in the operation. The operation 3040 may issue a trusted identity similar to the operation 2915 in FIG. 29.

In the operation 3010, if a failed match is determined an operation 3015 is performed to scan an identification. For example, the system may scan a government issued identification and determine the failed match by comparing the government issued identification and the stored identity information in an operation 3020. In other embodiments, other identifications than government identifications may be scanned. A scanned government issued identification may be any type of government issued identification, such as a driver's license, passport, birth certificate, social security card, or any other type of government issued identification.

In another embodiment, the operation 3015 may scan more than one identification (government issued or otherwise). For example, a system may scan a driver's license and another form of identification, such as a piece of mail, utility bill, or any other type of identification with the applicant's name and address printed on it.

In the operation 3020, if the system determines a match between the government issued identification information and/or the second form of identification to the stored identity information, the system issues the trusted identity in the operation 3040. In the operation 3020, if the system determines a failed match between the government issued identification information and/or the second form of identification to the stored identity information, the system, in an operation 3025, initiates, based on the determination of the failed match, a real time video communication session between the applicant device and a registration authority device configured to allow a registration authority to inspect identification information for determining a match between the identification information and the stored identity information. In the real time video communication session, the registration authority can inspect documents presented by the applicant to verify the applicant's identity as disclosed herein.

In an operation 3030, the system determines if there is a match based on the real time video communication session. Such a process can include receiving a registration authority verification of the match according to the one or more identity proofing requirements. In other words, after the registration authority has examined the documents, identifications, and/or authentication information of an applicant, the registration authority can indicate that the applicant's identity has been verified. If the identity is verified by the registration authority, the system can issue the trusted identity in the operation 3040 by sending a token to an issuing trusted identity service and sending, by the processor. Then, the trusted identity information can be sent to the applicant device from the issuing trusted identity service in response to the token. In FIG. 30, initiating the real time video communication session occurs after scanning the identification(s) determines the failed match. However, in other embodiments, the order may be switched, the identification information may be scanned during the real time video communication. In another embodiment, the real time video communication session may occur without an identification scan being performed.

At the operation 3030, the system may determine a failed match based on the real time video communication session. Such a determination may be based on an indication received by the registration authority device of a failure by the registration authority to determine the match. In other words, if the registration has reason not to verify an identity, such as inadequate documentation or identification, suspicious behavior, or any other reason, they may indicate into a registration authority device that the identity has not been verified. In an operation 3035, in response to the indication of the failed match by the registration authority, the system makes a referral to an in-person registration authority as disclosed herein. In some embodiments, the system can allow an applicant to schedule a time, date, and/or location for an in-person registration authority meeting to verify the identity. In some embodiments, the real time video communication session may be recorded. This recording can be stored for future use, such as auditing, quality review, or other purposes. In one embodiment, the system may store the session so that when a registration authority indicates a failed match, the video can be used to inform an in person identity verification. That is, a registration authority may use the recording to ensure that, during an in-person session, the applicant is the same person as the one in the recording, the applicant presents the same documents as presented in the recording, and/or that the applicant otherwise addresses the issues that occurred during the real time video communication session.

In one embodiment, the system may also determine one or more identity proofing requirements in response to an applicant's request for trusted identity information. In this way, the system may react to different types of requests that may have varying identity proofing requirements. For example, for requests of a first type, the process described with respect to FIG. 29 may be utilized. For other request types, the process described with respect to FIG. 30 may be utilized. In other words, upon receiving a request for trusted identity information and/or identity verification, the system can determine the identity proofing requirements that determine which process will be used. The system could also determine identity proofing requirements that involve some or all of the operations in FIGS. 29-32 in any order. For example, the system may determine one or more types of identification that should be scanned to verify an identity. Accordingly, the system can determine a failed match between the authentication information and the stored identity information based on the determined one or more identity proofing requirements.

Figure 31:
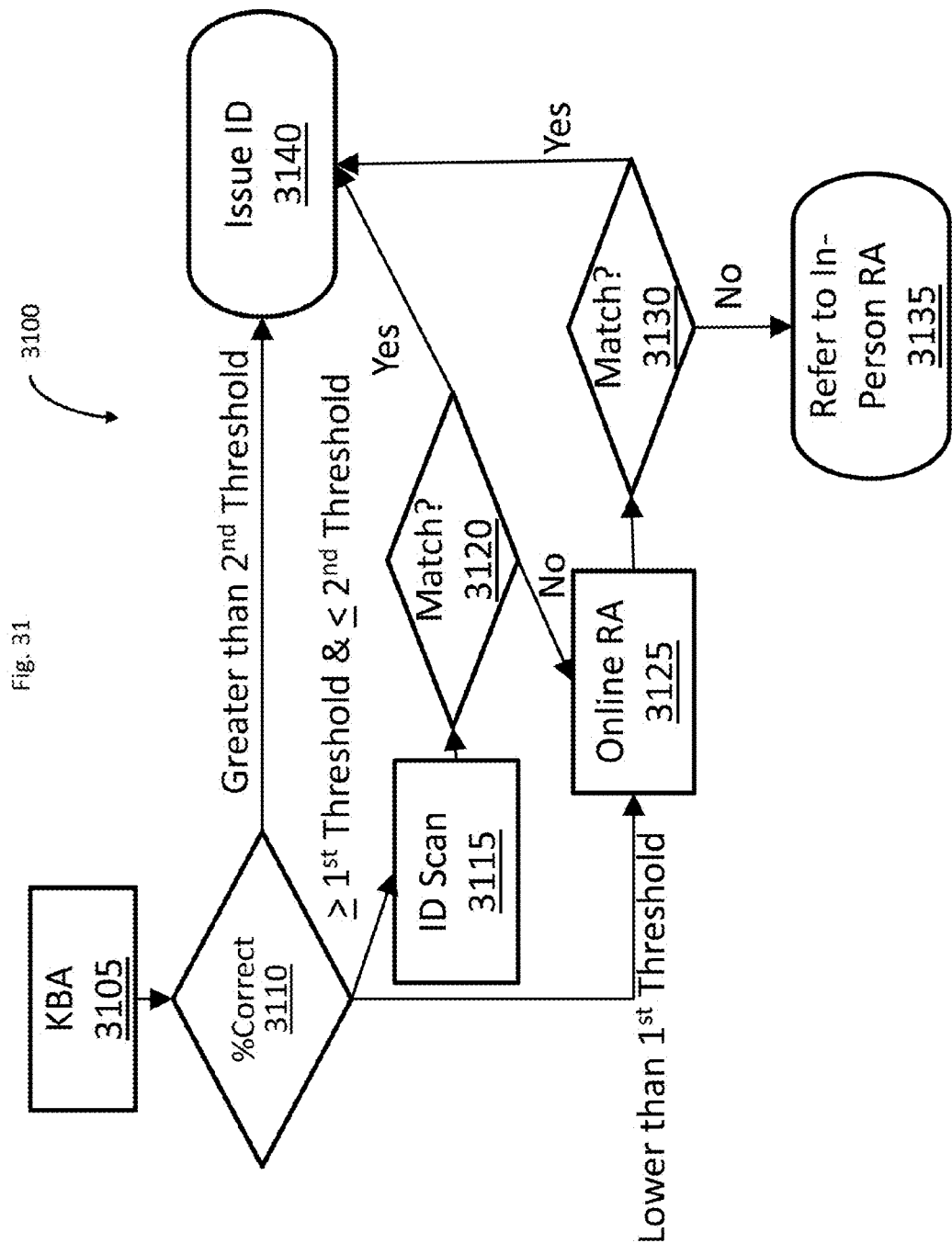
FIG. 31 is flow diagram illustrating a process for automated identity proofing incorporating an answer logic in accordance with an illustrative embodiment.

FIG. 31 is flow diagram illustrating a process 3100 for automated identity proofing incorporating an answer logic in accordance with an illustrative embodiment. In this embodiment, the system can follow different processes depending on the accuracy of the authentication information provided by the applicant. In an operation 3105, knowledge based authentication (KBA) questions are presented to the applicant device. The system can determine a full or partial match of the authentication information with the stored information at an operation 3110. In one embodiment, a failed may be the determination of a partial match between the authentication information and the stored identity information. In such an embodiment, the system may proceed in various ways such as proceeding to an identification scan at an operation 3115, proceed to an online registration authority with a real time video communication session at an operation 3125, or proceed to issuing a trusted identity in an operation 3140.

In one illustrative embodiment, in response to determining the partial match, the system will scan a government issued identification to determine a match (or failed match) between the government issued identification (or other identification type) and the stored identity information at the operation 3115. If the match is determined at an operation 3120, the system will proceed to issuing the trusted identification at the operation 3140. If a failed match is determined at the operation 3120, the system proceeds to the real time video communication session with the registration authority at the operation.

Accordingly, in this embodiment, the real time video communication session with the registration authority may occur after KBA or after an identification scan. If a match is determined based on the real time video communication session at an operation 3130, the system can proceed to issue the trusted identity at the operation 3140. If a failed match is determined at the operation 3130, the system can provide a referral to an in-person registration authority at the operation 3135.

The process 3100 uses an answer logic with regard to partial or full matches at the operation 3110. Applying an answer logic to determine an accuracy level of the failed match between the authentication information and the stored identity information can determine a level to which the authentication information provided by an applicant is correct with respect to the stored information. This level of correctness can determine how the process 3100 proceeds. In one example KBA may involve one or more questions. For example, if KBA involves three questions that an applicant must answer, the system could determine a level of correctness based on how many questions were answered correctly out of three. A partial match (a type of failed match) would involve answering any less than all three questions correctly. The level of correctness may be expressed as a number correct out of the total questions or as a percent correct. In another embodiment, the question(s) may be one or open ended questions. For example, the applicant may be presented with a KBA question but must respond with a self-generated answer rather than selecting from pre-made answers (as in a multiple choice question). Accordingly, at the operation 3110, the system may also judge correctness of authentication information (answers to KBA questions) on how close an applicant's answer matches an answer according to stored information about the applicant. For example, the system may inquire an applicant as to what the city of their birth was. A fully (100%) correct answer may be "Lansing." If an applicant responds to the question with the answer "Lansung," that may be considered a partial match and cause one of the alternate paths of the process 3100 to be followed. In another embodiment, the system may present multiple open ended questions and the system may determine aggregate correctness based on the answers to each question. In another embodiment, the system may present KBA that includes more than one type of question. In another example, a question may be considered 100% correct (a match) if the answer falls within a certain range. For example, an applicant may be asked to tell the approximate value of the money in one of the applicant's bank accounts. A 100% correct answer may be considered to be anything within $100 or 10% of the total money in the account. An answer may be considered a partial match if it is within a different amount or percent of the actual amount.

Regardless of how an accuracy level (level of correctness) is calculated or how many and/or what types of questions are asked as a part of KBA, an accuracy level may be compared to various thresholds to determine how to proceed in the process 3100. In FIG. 31, when the accuracy level of the failed match between the authentication information and the stored identity information is less than a first threshold, the real time communication session is initiated at the operation 3125. When the accuracy level of the failed match between the authentication information and the stored identity information is at least at the first threshold and less than a second threshold the system initiates scanning a government issued identification to determine a match between the government issued identification and the stored identity information at the operation 3115. When the accuracy level of the match between the authentication information and the stored identity information is greater than the second threshold, the system proceeds to the operation 3140, a token is sent to the issuing trusted identity service in order to issue the trusted identity. The thresholds used may be in any form. For example, the thresholds may be number of questions answered correctly, percentage of questions answered correctly, percentage of individual questions answered correctly averaged together with other individual question answer percentages, etc. In one illustrative embodiment, the first threshold is 50% and the second threshold is 99%. If such thresholds are applied to the process 3100, the process would proceed from the operation 3110 to the operation 3140 only when the authentication information (answers to the KBA) are higher than 99% correct. The process would proceed from the operation 3110 to the operation 3115 if the answers to the KBA are greater than or equal to 50% correct and less than or equal to 99% correct. The process would proceed from the operation 3110 to the operation 3125 if the answers to the KBA are less than 50% correct. Any different levels of thresholds may be used in various embodiments with the answer logic.

Figure 32:
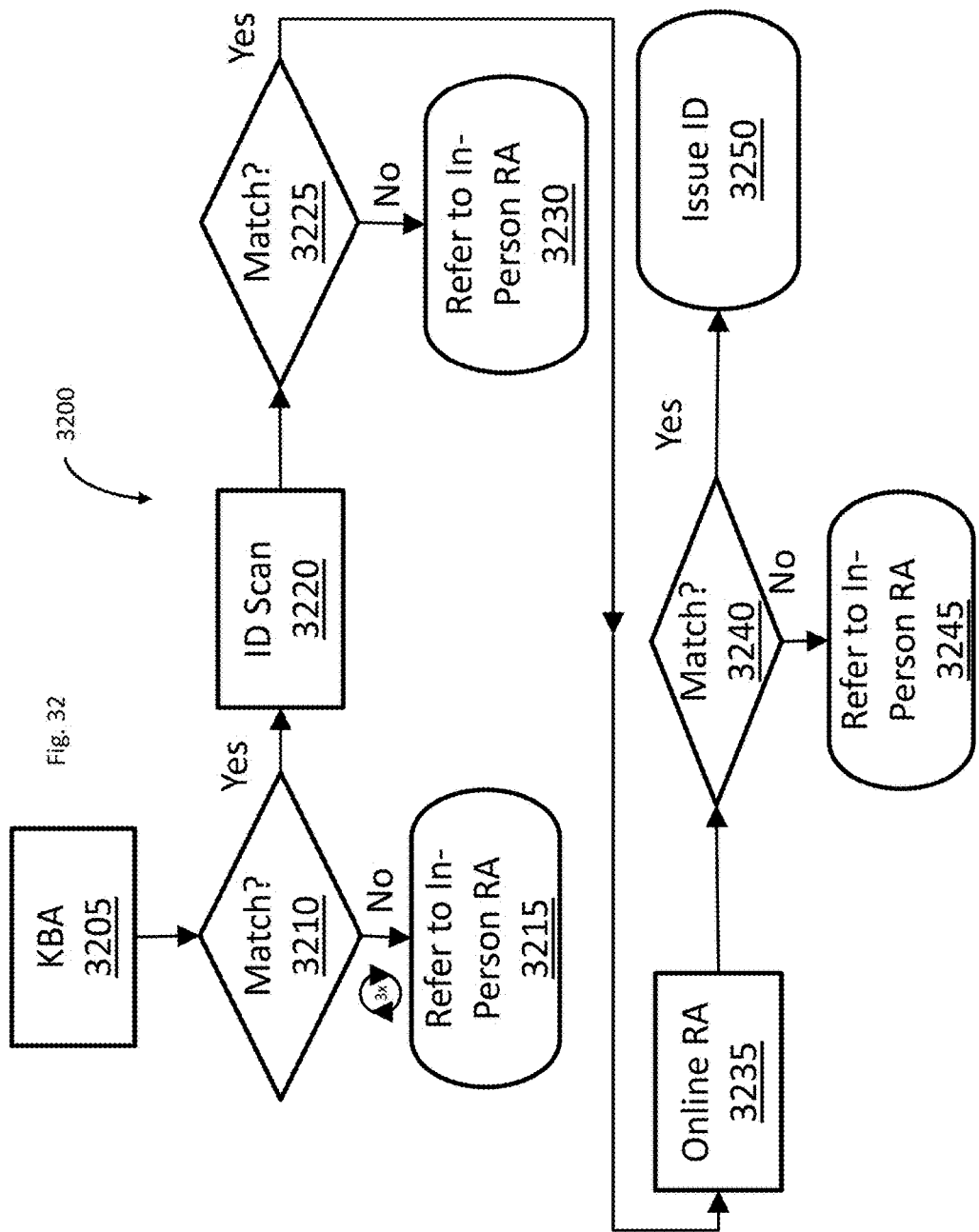
FIG. 32 is a flow diagram illustrating a process for automated identity proofing for level of assurance (LOA) 3 in accordance with an illustrative embodiment.

FIG. 32 is a flow diagram illustrating a process 3200 for automated identity proofing for level of assurance (LOA) 3 in accordance with an illustrative embodiment. This process 3200 can verify identities according to the LOA 3 standard for issuing trusted identities. In an operation 3205, KBA is presented to the applicant (via the applicant device). In an operation 3210, the system determines if the KBA answers (the authentication information) matches stored information about the applicant. If a failed match (or partial match) is determined, the system refers the applicant to an in-person registration authority in an operation 3215.

In an operation 3220, the system performs an identification scan in response to the system determining a match at the operation 3210. For LOA 3, the identification scan at the operation 3220 includes scanning at least two forms of identification of the applicant. If a failed match is determined for the identification scan at an operation 3225, the system refers the applicant to an in-person registration authority at an operation 3230. If a match is determined for the identification scan at the operation 3225, a real time video communication session is started between the applicant device and a registration authority device configured to allow a registration authority to inspect identification information for determining a match between the identification information and the stored identity information. The identification information may include the scanned identification from the operation 3220.

In an operation 3240 if a match is not indicated (failed match determined) by the registration authority, the system refers the applicant to an in-person registration authority at an operation 3245. If the match is indicated by the registration authority at the operation 3240, the system proceeds to issue the trusted identity as disclosed herein at an operation 3250.

FIG. 33 is a flow diagram illustrating a process 3300 for automated identity proofing in accordance with an illustrative embodiment. The process 3300 can verify an identity based on any combination of two or more of credit-based, clinical-based, and/or claims-based information. Such information can be used as knowledge based authentication (KBA) or used in addition to other KBA to verify an identity. For example, clinical-based information from a clinical database can be used to ask whether a person went to a particular hospital during a particular month based on information in the clinical database (e.g., "Did you go to the University of Michigan hospital for a broken arm in March 2017?"). Similarly, claims-based information from a claims database can be used to ask whether a person submitted a particular claim (e.g., "Did you submit a claim in 2017 for a visit to an orthopedic surgeon?"). One of the primary advantages of this invention is creating combinations such as claims-based and clinical-based, and/or clinical-based and credit-based, or all three of claims-, clinical-, and credit-based information in novel ways to create and ask unique questions with verifiable answers to grant access and/or issue trusted identities.

The process 3300 can be used with a request for trusted identity information and authentication information associated with the identity as disclosed herein. Alternatively, process 3300 can be used to prove identity to grant access and not to issue a trusted identity. In operation 3305, the system receives credit, clinical, and/or claim information associated with an individual from one or more databases. In an operation 3307, a knowledge based authentication (KBA) can be applied, where the applicant provides answers to questions about credit, clinical, and/or claim information, which can then be compared with information received in operation 3305 to determine if the answers provided are correct in an operation 3310. As one example, the credit-based, clinical-based, and claims-based information can be stored in one or more databases such as a master person index or other storage for information. Here, a failed match is determined if incorrect authentication information is received from the applicant device more than a predetermined number of attempts. In FIG. 33, the number of permitted attempts with a failed match is three (3) times. However, in other embodiments one, two, four, or any other number of attempts may cause the failed match to be determined. Determining the failed match with KBA may include, for example, sending a request for KBA information to the applicant device and subsequently receiving at least one reply that includes information that fails to satisfy the request for the KBA information.

In an operation 3315, the system can grant access to the applicant based on a successful match in operation 3310. For example, the system may send a token to a requesting service that indicates the applicant identity has been proofed. In response, the requesting service may send a key or provide access in some other way to the applicant device in response to the token. In other embodiments, the system may also incorporate the identity service as a part of the same system to which the applicant desires access.

In an operation 3320, the system refers the applicant (or provides a referral) to an in-person registration authority if a failed match is determined between the authentication information and the stored identity information. A failed match is determined when authentication information or identification provided by an applicant does not match the stored identity information stored in a database, such as a master person index. An in-person registration authority is a person who can manually check identification provided by an applicant to issue a trusted identity.

In any of the processes disclosed in FIGS. 30-33, the system may determine a failed match and proceed according to the failed match regardless of whether a failed match is actually present or not. This can increase security by performing additional identity proofing even when an applicant can, for example, answer KBA inquiries correctly. For example, the system may implement a certain number of random failed matches even when KBA is answered correctly (i.e., the system treats an applicant as a failed match applicant even if they have provided correct authentication information). For example, if the process in FIG. 31 is being implemented, the system may proceed from the operation 3010 to the operation 3015 for a certain percentage of applicants that correctly answer all KBA questions. For example, the system may implement this for 1% of all correct answers at KBA. This can increase security of the system and prevent and detect fraud. In another example, a certain percentage of applicants may, at the operation 3225 of FIG. 32, be referred to an in-person registration authority even after a successful scan of identification at the operation 3220. In another example, a certain percentage of applicants may, at the operation 3120 of FIG. 31, have a real time video communication session initiated with a registration authority even if correct KBA has been determined at the operation 3110 and/or an identification scan has been correctly completed at the operation 3115. Accordingly, in any configuration or process, the system may randomly cause a failed match to be determined and the real time video communication session initiated based on a random selection of an applicant occurring according to a specified random screening threshold (a number or threshold of applicants).

The systems and methods disclosed herein may also utilize a common key identifier unique to an individual associated with a request to verify and identity and issue a trusted identity. A common key identifier and uses thereof are described in U.S. patent application Ser. No. 14/643,910, which is incorporated by reference herein in its entirety. A common key identifier is associated with one individual to link disparate records and information together in a safe, convenient, and confidential way. For example, if two separate entities have records on the same individual but those entities do not have any way to link the records together, a broker of the records may link the records together using a common key identifier. That is, a common key identifier can be applied to both entities records, so that any time records for that individual need to be accessed/used/changed/etc., the system will be able to access/locate all possible information related to the individual using the common key identifier. Accordingly, the system can incorporate the use of a common key identifier to enhance the identity proofing functionality.

For example, after a real time video communication session is initiated, the system can receive a registration authority verification of the match according to one or more identity proofing requirements and determine a common key identifier unique to an individual associated with the request. The system may determine the common key identifier for the individual/applicant depending on whether a common key identifier for an individual already exists or not. For example, where a common key identifier already exists for the individual applying for the trusted identity, the determination of the common key identifier includes a determination of a match of the stored identity information and/or the authentication information to identification information associated with the common key identifier as stored in a master index. In the alternative, where a common key identifier does not yet exist (or for some reason it cannot be determined that a common key identifier exists for the individual), the system generates a common key identifier to assign to the applicant/individual. For example, a common key identifier may be determined in response to a failed match of the stored identity information and/or the authentication information to identification information as stored in a database. In some embodiments, the database may be the master index that is used to store common key identifiers. After generating the common key identifier, the system can send a trusted identity service the generated common key identifier such that the common key identifier is permanently associated with the trusted identity in the master index or a database maintained by the trusted identity issuer. In other words, once the common key identifier is generated, it can be used in the future for records requests or edits, or as identification information for future identity proofing requests. The system can also issue the trusted identity information to the applicant device. Accordingly, whether the common key identifier is generated or identified, it can be included with a token to a trusted identity provider, so that the trusted identity provider/issuer can also associate the individual/applicant with the common key identifier.

Accordingly, The system can also associate the trusted identity information that is issued to an applicant with the common key identifier, including any other information issued such as a Direct messaging account. The system can also associate secure messaging information, such as a Direct messaging account, with the common key identifier.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method according to a set of instructions stored on the memory of a computing device, the method comprising:
   receiving, by a hardware processor of the computing device, a request to verify an identity from an applicant device, wherein the request comprises an applicant identification and an application identification for an application to which access is desired;
   receiving, by the hardware processor, a combination of any of credit-based, clinical-based, and claims-based information corresponding to an applicant identified in the received request;
   requesting, by the hardware processor to the applicant device, knowledge-based authentication (KBA) information by sending one or more queries related to the received combination of information according to one or more identity proofing requirements;
   receiving, by the hardware processor from the applicant device, the KBA information in the form of one or more responses to the one or more queries;
   determining, by the hardware processor, a match between the KBA information and the received combination of information;
   repeating, by the hardware processor, if the match is not determined, the requesting and the receiving the KBA information steps;
   determining, by the hardware processor, a failed match if the match is not determined after the requesting and the receiving the KBA information steps have been repeated for a predetermined number of times; and
   initiating, by the hardware processor, if the failed match is determined, a real-time video communication session between the applicant device and a registration authority device configured to allow a registration authority to inspect identification information for determining a match between the identification information and the received combination of information.

2. The method of claim 1, further comprising granting to the applicant device, by the hardware processor, if the match is determined, access to the desired application by sending an access token to the applicant device.

3. The method of claim 1, wherein determining the match further comprises sending a question to the applicant device regarding credit information associated with the applicant from the received combination of information.

4. The method of claim 1, wherein determining the match further comprises sending a question to the applicant device regarding clinical information associated with the applicant from the received combination of information.

5. The method of claim 1, wherein determining the match further comprises sending a question to the applicant device regarding claims information associated with the application from the received combination of information.

6. The method of claim 1, wherein determining the match comprises applying an answer logic to determine an accuracy level of the match between the KBA information and the received combination of information, and further wherein:
   when the accuracy level of the match between the KBA information and the received combination of information is less than a first threshold, the desired access is not granted to the applicant device, and
   when the accuracy level of the match between the KBA information and the received combination of information is at least at the first threshold the desired access is granted to the applicant device.

7. The method of claim 1, wherein, when the match between the KBA information and the received combination of information does not meet at least a first threshold amount, a referral to an in-person registration authority is provided.

8. The method of claim 1, wherein the predetermined number is three.

9. A non-transitory computer readable medium having instructions stored thereon that, upon execution by a computing device, cause the computing device to perform operations, wherein the instructions comprise:
   instructions to receive a request to verify an identity from an applicant device, wherein the request comprises an applicant identification and an application identification for an application to which access is desired;
   instructions to receive a combination of any of credit-based, clinical-based, and claims-based information corresponding to an applicant identified in the received request;
   instructions to request, to the applicant device, knowledge-based authentication (KBA) information by sending one or more queries related to the received combination of information according to one or more identity proofing requirements;
   instructions to receive, from the applicant device, the KBA information in the form of one or more responses to the one or more queries;
   instructions to determine a match between the KBA information and the received combination of information;
   instructions to repeat, if the match is not determined, the instructions to request and receive the KBA information;
   instructions to determine a failed match if the match is not determined after the instructions to request and receive the KBA information have been repeated for a predetermined number of times; and
   instructions to initiate, if the failed match is determined, a real-time video communication session between the applicant device and a registration authority device configured to allow a registration authority to inspect identification information for determining a match between the identification information and the received combination of information.

10. The non-transitory computer readable medium of claim 9, wherein the predetermined number is three.

11. A system comprising:
   a memory;
   a hardware processor coupled to the memory; and a first set of instructions stored on the memory and configured to be executed by the hardware processor, wherein the hardware processor is configured to:
receive a request to verify an identity from an applicant device, wherein the request comprises an applicant identification and an application identification for an application to which access is desired;
receive a combination of any of credit-based, clinical-based, and claims-based information corresponding to an applicant identified in the received request;
request, to the applicant device, knowledge-based authentication (KBA) information by sending one or more queries related to the received combination of information according to one or more identity proofing requirements;
receive, from the applicant device, the KBA information in the form of one or more responses to the one or more queries;
determine a match between the KBA information and the received combination of information;
repeat, if the match is not determined, the requesting and the receiving the KBA information steps;
determine a failed match if the match is not determined after the requesting and the receiving the KBA information steps have been repeated for a predetermined number of times; and
initiate, if the failed match is determined, a real-time video communication session between the applicant device and a registration authority device configured to allow a registration authority to inspect identification information for determining a match between the identification information and the received combination of information.

12. The system of claim 11, wherein the hardware processor is further configured to determine a common key identifier unique to an individual associated with the request to grant access.

13. The system of claim 12, wherein the determination of the common key identifier comprises a determination of a match of the received combination of information or the KBA information to identification information associated with the common key identifier as stored in a master index.

14. The system of claim 12, wherein the hardware processor is further configured to, as part of the determination of the common key identifier:
generate the common key identifier in response to a failed match of the received combination of information or the KBA information to identification information as stored in a master index; and
send a trusted identity service the generated common key identifier such that the common key identifier is permanently associated with the trusted identity in the master index.

15. The system of claim 12, wherein the hardware processor is further configured to associate the grant of access with the common key identifier.

16. The system of claim 14, wherein the identification information associated with the common key identifier in the master index is used, at least in part to determine the match.

17. The system of claim 11, wherein the hardware processor is further configured to determine one or more identity proofing requirements in response to the request for access to the application.

18. The system of claim 17, wherein the hardware processor is further configured to determine the match between the KBA information and the received combination of information based on one or more identity proofing requirements.

19. The system of claim 11, wherein the predetermined number is three.

* * * * *